United States Patent [19]

Skerlos et al.

[11] 4,356,509
[45] Oct. 26, 1982

[54] MICROCOMPUTER-CONTROLLED TELEVISION/TELEPHONE SYSTEM AND METHOD THEREFORE

[75] Inventors: Peter C. Skerlos, Arlington Heights; Paul A. Snopko, Chicago; Frank C. Templin, Arlington Heights; Thomas J. Zato, Palatine, all of Ill.

[73] Assignee: Zenith Radio Corporation, Glenview, Ill.

[21] Appl. No.: 243,010

[22] Filed: Mar. 12, 1981

[51] Int. Cl.³ .............................................. H04N 5/00
[52] U.S. Cl. .................... 358/85; 179/1 HF; 179/2 TV; 358/194.1; 455/603
[58] Field of Search ............... 358/85, 191.1, 194.1, 358/147; 179/2 TV, 1 HF; 455/603

[56] References Cited

U.S. PATENT DOCUMENTS

| | | | |
|---|---|---|---|
| 4,225,754 | 9/1980 | Bernard et al. | 179/1 HF |
| 4,232,200 | 11/1980 | Hestad et al. | 179/90 B |
| 4,243,845 | 1/1981 | Feinberg et al. | 179/90 B |
| 4,270,145 | 5/1981 | Farina | 358/194.1 |
| 4,318,130 | 3/1982 | Heuer | 358/191.1 |

FOREIGN PATENT DOCUMENTS

| | | | |
|---|---|---|---|
| 2851171 | 6/1979 | Fed. Rep. of Germany | 358/147 |
| 1308162 | 2/1973 | United Kingdom. | |
| 2002995 A | 2/1979 | United Kingdom. | |

OTHER PUBLICATIONS

*Electronic Servicing*, Jan. 1981, pp. 23-27, Grieshaber, "New Zenith Features".
4-Bit One-Chip Micro Computers MN1400 Series, Motorola Semiconductors MC14408, MC14409.

*Primary Examiner*—Howard Britton

[57] ABSTRACT

A television receiver incorporating telephone interface circuitry permitting the viewer to not only answer incoming calls but also place outgoing calls by means of the television receiver is disclosed. An infrared link is used for remote control telephone answering and dial-out with a tuner-integrated microcomputer used to drive a character generator permitting the number dialed to be displayed on the television receiver's video display and to be provided to a standard telephone line. An automatic re-dial feature is provided by means of the microcomputer's memory whereby the last phone number dialed by the remote transmitter may be stored in memory, recalled by means of a single button selection, presented on the on-screen display and automatically dialed. The microcomputer-driven character generator also controls telephone interface circuitry and switching between television and telephone modes while providing for a privacy mode in which a television-mounted microphone is turned off in selectively muting audio output to the other telephone subscriber.

32 Claims, 9 Drawing Figures

MICROCOMPUTER-CONTROLLED TELEVISION/TELEPHONE SYSTEM AND METHOD THEREFORE

CROSS-REFERENCE TO RELATED APPLICATIONS

This application is related to the following applications which are assigned to the assignee of the present application: Ser. No. 109,424, filed Jan. 2, 1980, entitled "Television Receiver With Two-Way Telephone Conversation Capability" in the name of Paul Snopko; Ser. No. 175,465, filed Aug. 5, 1980, entitled "Television Receiver With Two-Way Telephone Conversation and Dial-Out Capabilities", in the name of Paul Snopko; and Ser. No. 260,639, filed May 4, 1981, entitled "Character Generator With Latched Outputs", in the names of Peter C. Skerlos, Jeffery Puskas and Thomas J. Zato.

BACKGROUND OF THE INVENTION

This invention relates generally to a system and method for placing and receiving telephone calls through a television receiver, and more particularly relates to a system and method involving a microcomputer-controlled television receiver coupled to a conventional telephone line which provides for the remote control dial-out and receipt of telephone calls by means of the television receiver.

The basic telephone has been utilized in various combinations to enhance communications between subscribers. For example, the telephone has been combined with a video display to form a video telephone capable of transmitting audio and video information between parties. While beyond the experimental stage of development, these systems still suffer from limitations which have inhibited their widespread use by the general public. These systems not only require a dedicated video camera, but also involve the use of two high quality, wide band video transmission networks for two-way simultaneous video communication. The additional complexity involved with the transmission of video information has severely limited the use of these video telephone systems.

The telephone has also been integrated with a remote control system for initiating or answering a telephone call and communicating while remotely located from the telephone itself. Remote audio communication by means of a telephone is typically accomplished by means of a "speaker" telephone of conventional design incorporating a loud speaker for amplifying the incoming audio signals in combination with a high sensitivity microphone for picking up audio signals in the vicinity of the telephone. One such "speaker" telephone system is considered in U.S. Pat. No. 4,225,754 to Bernard et al wherein is disclosed a loud speaker telephone incorporating a differential coupler connecting a two-way, two-wire telephone line to separate transmission and reception channels including, respectively, a microphone and a loudspeaker. The alleged improvement offered by this invention involves the attenuation of echo signals produced in the area surrounding the telephone which generate self oscillations producing howling noises (the Larson effect) making telephone conversation difficult if not impossible. United Kingdom Patent Application No. 2,002,995A to Klein et al which utilizes a remote control device such as a hand-held keyboard permitting the subscriber to establish a telephone network connection while remotely located from the telephone so that screen text information may be transmitted between subscribers and information banks via their television receivers and/or for permitting one subscriber to conduct a telephone conversation with another subscriber. Few details regarding the detailed design and operation of this system are contained in the application, but the limited disclosure does indicate that this approach is complicated by the requirement of a modem MD in combination with a remote control device FBSt which is located in the television receiver. Thus, this system makes limited use of equipment already available in a conventional television receiver while requiring additional complicated interface equipment such as a modem. United Kingdom Pat. No. 1,308,162 to Lynfield discloses a telephone system including a base unit and a portable unit adapted to cooperate with one another via a radio link. An RF transmitter connected to the telephone network receives a telephone line audio signal which it, in turn, transmits to the portable, remote unit. The remote unit includes an RF receiver/transmitter adapted to transmit a second RF signal back to the base unit thus establishing a two-way, remote telephone communications link. The two-way capability of this system necessitates the incorporation of a transmitter and receiver in the remote unit which is not designed to interface directly with the telephone system but which requires a base unit to handle the RF link and to interface the remote unit with the telephone lines. While offering an added dimension in providing enhanced telephone access, this complicated and expensive system fails to offer an alternative capable of widespread acceptance and availability.

Various dialing systems have also been utilized in telephones with the more innovative primarily involving the storage and recall of preferred, frequently dialed numbers using a microprocessor or microcomputer. One such arrangement is disclosed in U.S. Pat. No. 4,232,200 to Hestad et al wherein is disclosed a telephone repertory dialing system capable of converting from push button dialing to rotary outpulsing or dual-tone multifrequency dialing. Telephone numbers are programmed for dialing using the telephone keypad by means of a microprocessor with the repertory numbers and the last number dialed being stored in an electronic memory. Batteries are provided for power to selected portions of the electronic equipment in the event the telephone is unplugged from the line or where the telephone is operated over an excessively long loop length. Another repertory telephone dialing system is disclosed in U.S. Pat. No. 4,243,845 to Feinberg et al. This apparatus utilizes a keyboard array having a plurality of digit keys and an additional key for storing at a predetermined selected location in a memory device a dialed telephone number. Also included is another selectable key for retrieving the stored telephone number from memory and providing it to signal generating means responsive to the dialed number as retrieved to generate a signal capable of transmission via a telephone line and indicative of the previously dialed telephone number. Both of these devices operate directly with a telephone for the sole purpose of providing a rapid telephone number dialing capability. Finally, Motorola MC14408 and MC14409 integrated circuits are devices designed to convert a four bit binary input code to a number of serial output pulses corresponding to the value of the input code. These devices can be used in telephone dialing applications and, when integrated with a RAM and appropriate controls, may be used in repertory dialing applications.

From the above discussion it can be seen that the conventional telephone has been combined with various other devices to facilitate or enhance subscriber use of the telephone. The present invention permits a television receiver having a microcomputer-controlled tuning system to serve as a remotely controlled "speaker" telephone in which the channel tuning system also functions in the telephone call and pick-up processes.

OBJECTS OF THE INVENTION

Accordingly it is an object of the present invention to provide a novel means and method for integrating a telephone in a television receiver.

It is another object of the present invention to provide a novel method of and means for telephone communications.

Still another object of the present invention is to provide an improved means and method for communicating via telephone by means of a microcomputer-controlled television receiver incorporating remote telephone/television receiver control.

A still further object of the present invention is to provide an improved means and method for providing a visual presentation to a telephone caller of a dialed telephone number.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENTS

Figure 1:
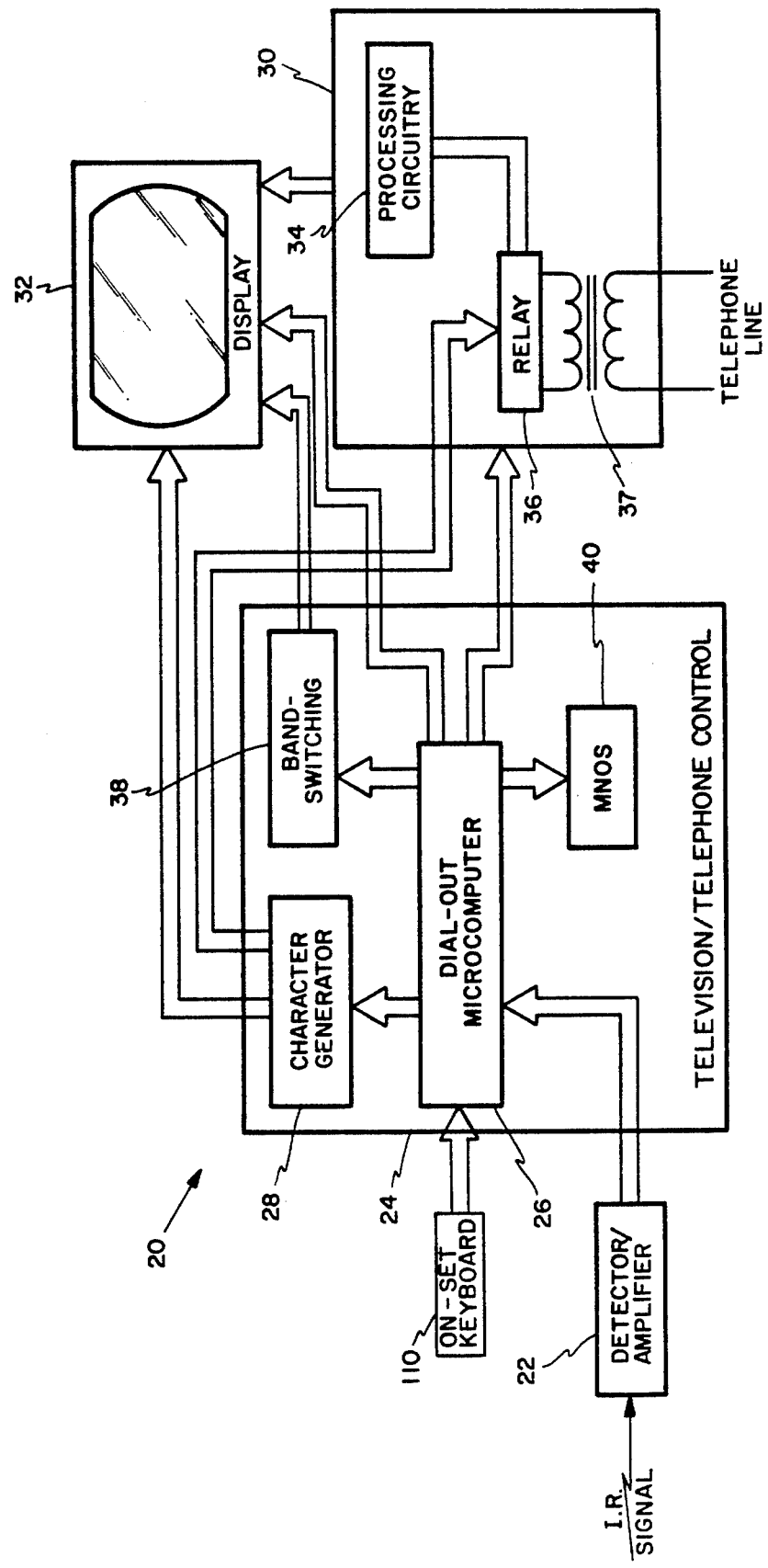
FIG. 1 is a generalized block diagram of a microcomputer-controlled television/telephone system in accordance with the present invention.

Referring to the block diagram of FIG. 1, there is shown the microcomputer-controlled television/telephone system 20 of the present invention. This system includes a television/telephone control unit 24 in the television receiver for tuning to selected channels and dialing a desired telephone number. Control unit 24 is connected to infrared (IR) receiver/amplifier 22 which, in turn, receives pulse code modulated IR signals from a remote control transmitter unit (not shown). The IR receiver/amplifier 22 receives, amplifies and provides a squared output control signal from the remote controller transmitter to control unit 24. The squared output signal consists of pulses which contain serial data bits and is provided to control unit 24. The pulses are then transmitted through a noise removing RC filter into microcomputer 26 for decoding. The decoding process is implemented by means of stored hardware logic in microcomputer 26 and is controlled by the microcomputer software program contained in the microcomputer's ROM (read only memory). Microcomputer 26 provides appropriate outputs during the channel selection and tuning process to B+ and bandswitching circuitry 38, channel tuning circuitry, and MNOS memory 40 for future programming of the television receiver, e.g., favorite channel tuning and volume information.

Microcomputer 26 also provides appropriate digital outputs to character generator 28 which is connected to display 32 for the presentation thereon of the received video signal and the dialed telephone number and to telephone interface circuitry 30. The microcomputer-controlled television/telephone system 20 is connected to the telephone line by means of a standard telephone cable. Telephone interface circuitry 30 is isolated from the phone lines by isolation transformer 37, a photo detector isolator for ring detection (not shown), and off-hook relay 36 in accordance with FCC requirements.

Figure 2:
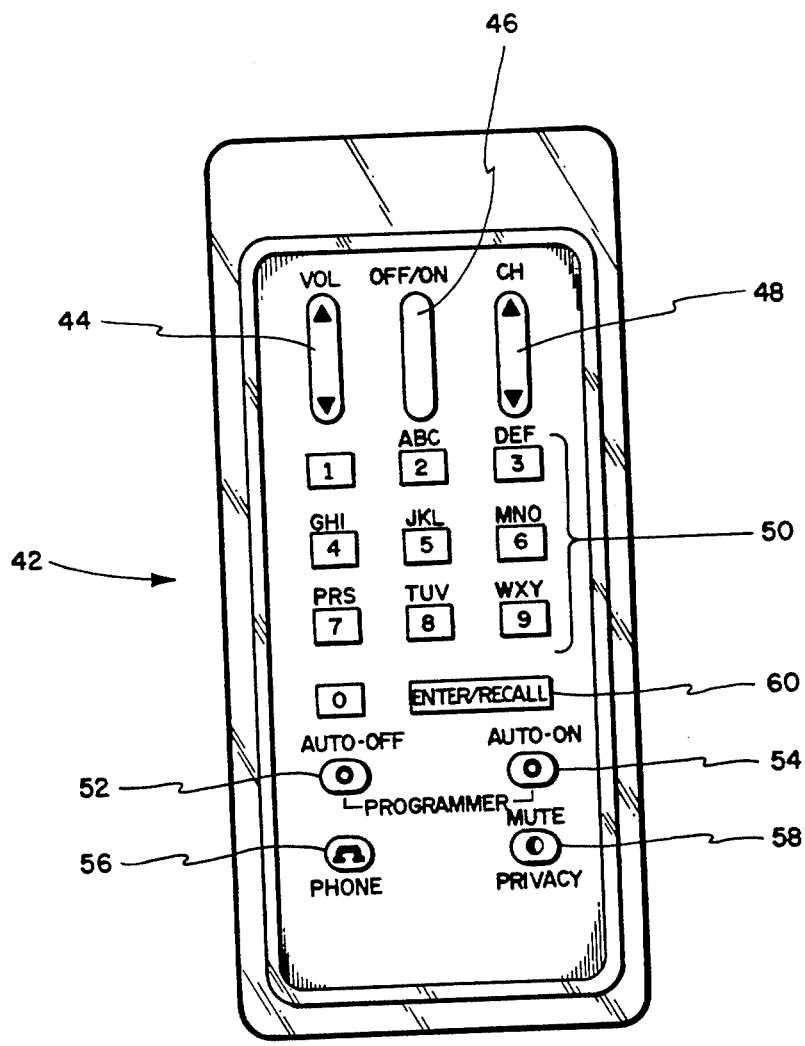
FIG. 2 shows a remote control panel for use in a microcomputer-controlled television/telephone system in accordance with a preferred embodiment of the present invention.

A brief summary of the organization of incoming call signal processing circuitry 34 in telephone interface circuit 30 follows. When an incoming call is received, the signal appears on the telephone line. Signal switching is accomplished by means of isolation relay 36. When relay 36 is in its normal unpowered position, the signal is transmitted through the relay to opto-isolator circuitry which activates the ring detection circuit in signal processing circuit 34. A light emitting diode (LED) ring indicator on the front panel of the television receiver is then activated and flashes at approximately a 20 Hz rate. The ringing signal turns normal television receiver audio off and replaces it with an electronically generated ring tone. When the viewer selects the telephone mode of operation, which will be discussed in detail later, IR detector/amplifier 22 detects viewed initiated selection of the telephone mode of operation and sends a control signal by means of microcomputer 26 and character generator 28 to activate LED driver circuits and processing circuitry 34. After detection, the circuit switches isolation relay 36 connecting the telephone line to isolation transformer 37, turning off the ringing circuit, with a volume control circuit switched to the audio amplifier which amplifies the incoming audio from the telephone line. The LED ring indicator on the front of the television receiver is lighted continuously during the telephone call to indicate that television/telephone system 20 is in the telephone mode of operation. The volume of the incoming audio can be controlled using the volume control 44 on the remote control unit 42 as shown in FIG. 2. The details of telephone interface circuit 30 are primarily involved with the reception of incoming telephone calls and do not form a part of the present invention. Any number of circuit schemes could be implemented in interfacing the television/telephone system 20 of the present invention with a conventional telephone line. Details regarding a preferred embodiment of telephone interface circuit 30 can be found in pending patent applications: Ser. No. 109,424, filed Jan. 2, 1980, entitled "Television Receiver With Two-Way Telephone Conversation Capability" in the name of Paul Snopko, and Ser. No. 175,465, filed Aug. 5, 1980, entitled "Television Receiver With Two-Way Telephone Conversation and Dial-Out Capabilities", also in the name of Paul Snopko. Both of these pending patent applications are assigned to the assignee of the present invention and are hereby incorporated by reference in the instant patent application.

The IR remote control transmitter 42 is shown in FIG. 2 and is of conventional electronics design and configuration incorporating, generally, IR emitting diodes, an integrated circuit, a transistor, an oscillator adjustment potentiometer, a 4×8 matrix keyboard, and a 9 volt battery. The electronic configuration and operation of remote control unit 42 will not be further discussed as it does not form a part of the present invention, however, the various controls incorporated in this control unit as shown in FIG. 2 will be further described. A sixty-four level volume control 44 is included to adjust the volume of the television receiver in the television mode of operation and the telephone output to the television receiver's speaker in the telephone mode of operation to the desired level. OFF/ON control 46 provides "OFF" and "ON" control of the television receiver in the television mode of operation while channel selector 48 permits programmed channel scanning selection during the television mode of operation. Direct access channel selection is accomplished by means of desired channel number selection on matrix keyboard 50 followed by selection of the ENTER/RECALL control 60 within a predetermined time period following channel number entry. In the telephone mode of operation which is achieved by selection of phone control 56 the alpha-numeric characters displayed on matrix keyboard 50 are utilized for telephone number dialing. AUTO OFF control 52 and AUTO ON control 54 are utilized in the automatic programming of the television receiver to turn on at a predetermined time or to turn off at a predetermined time in accordance with information stored in RAM 86. As previously stated, phone control 56 is utilized in converting the microcomputer-controlled television/telephone system 20 to the telephone mode of operation and its use, together with that of MUTE/PRIVACY control 58, will be described in detail presently.

After any key is pressed on remote control unit 42 a pulse code modulated (PCM) output is initiated by a transmitter located therein. In the preferred embodiment of the present invention the transmitted signal is in the infrared (IR) spectrum because of various desirable operating characteristics of this frequency band, e.g., lower noise levels. However, it should be obvious that signals in the ultrasonic, RF, or any of the more conventional operating frequency spectra could be used without departing from the spirit of the present invention. The PCM output code consists of a start bit, five groups of a data bit and its complement. The entire code, therefore, consists of eleven bits of information with a single pulse representing the "0" state while a double pulse represents the "1" state. The pulses are modulated by a 40 KHz clock signal in order to translate the signal to a higher frequency to avoid the usual spectrum of IR noise which is most predominant at lower frequencies. The 11 bits are transmitted in approximately 56 milliseconds with the 11 bit code repeated every 180 milliseconds as long as the transmitter key is depressed. There is a 40 millisecond delay after a key is depressed before the transmission of the first data bit. The codes of all transmitter functions have the same period, however, the 5 bit data code is unique for each function.

Figure 3:
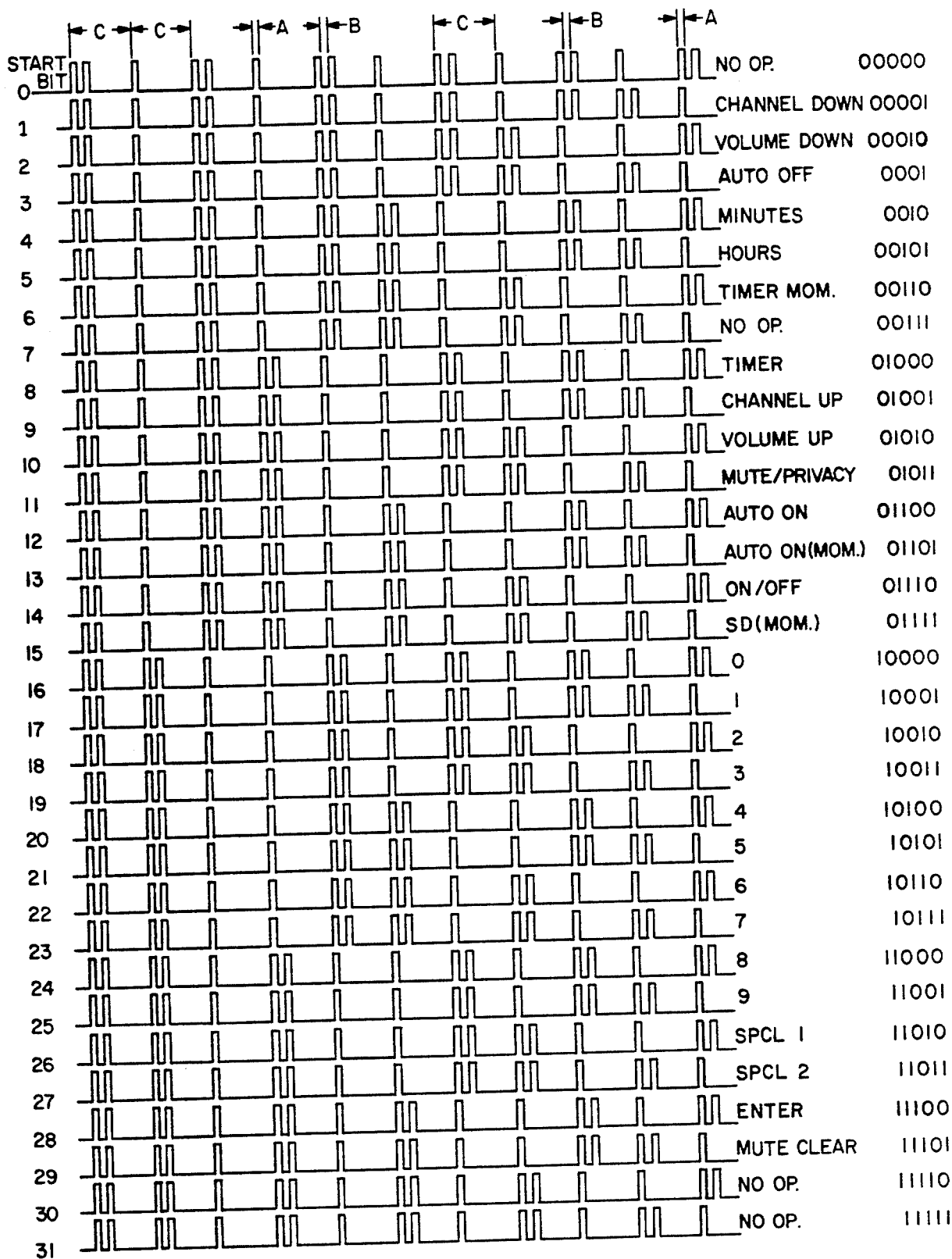
FIG. 3 shows the various coded output pulse patterns of the remote controller and the commands, or functions, initiated by the individual pulse trains.

From the previous discussion it can be seen that while a touch tone keyboard typically uses a multifrequency code to generate the telephone dialing signals, remote control unit 42 of the present invention uses a pulse code modulated data bit group in providing dialing information to a microcomputer-controlled dialing system. Shown in FIG. 3 are the modulated pulse codes for the operations available by means of remote control unit 42 in controlling the television and telephone modes of operation of microcomputer-controlled television/telephone system 20. The interval "A" represents individual pulse duration and is 500 microseconds. The interval "B" represents the inter-pulse interval and also is 500 microseconds. The interval "C" represents the 5.6 millisecond data bit period.

Figure 4:
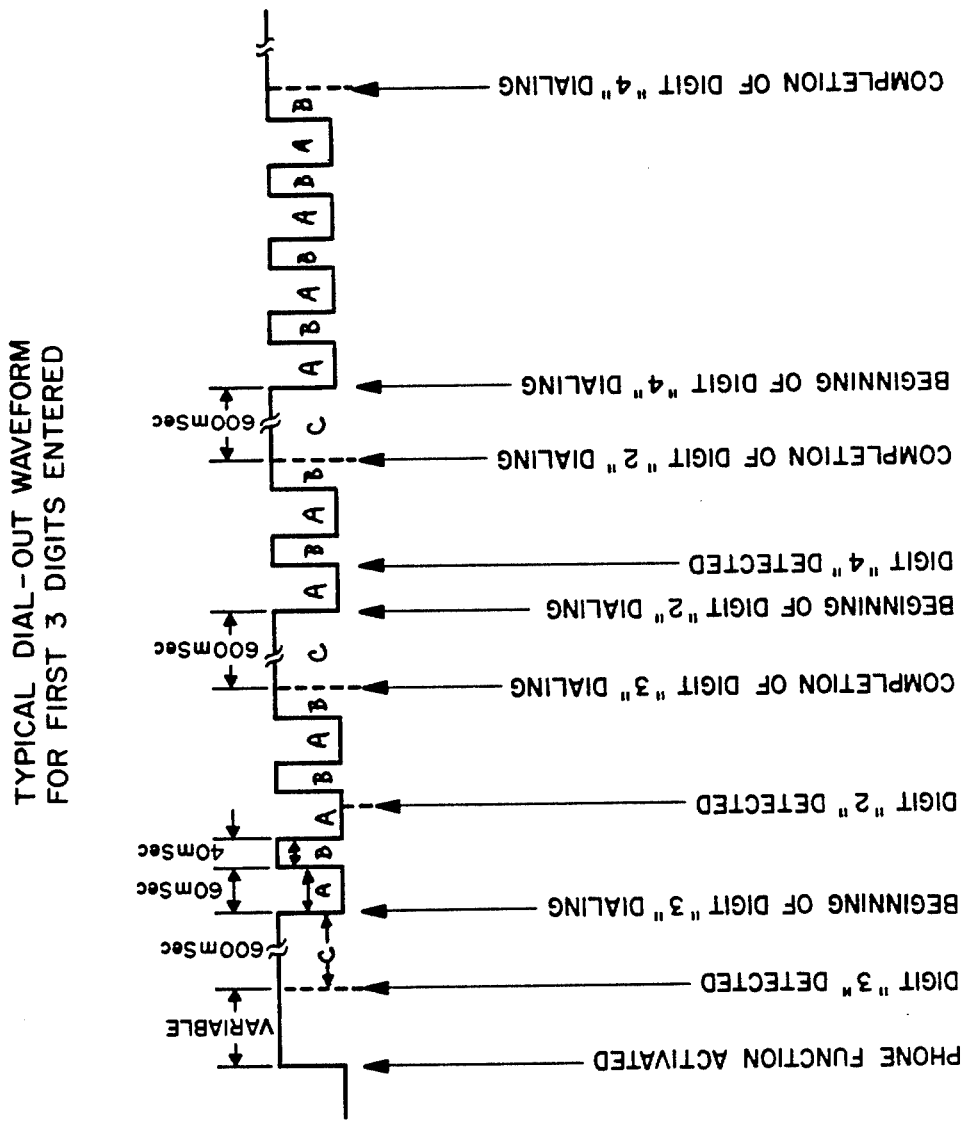
FIG. 4 includes a typical pulse waveform for the first three digits entered in the dial-out signal provided by the telephone/television receiver system to the telephone lines in dialing a desired telephone number.

Shown in FIG. 4 is a typical dial-out waveform for the first three entered digits of the desired telephone number provided by telephone interface circuit 30 to a telephone line. Once the phone line has been accessed to make an outgoing call by means of telephone selector 56, a dial tone is heard over the television receiver's speaker (not shown). Remote control unit now becomes a remote telephone keyboard for generating a pulse train as shown by the representative waveforms of FIG. 3. The dial output signal consists of an individual pulse duration of 40 msec while the inter-pulse interval is 60 msec. This corresponds to the make/break pulse train intervals of a conventional mechanical dialing system and permits the present invention to interface directly with a convention telephone dialing system set up to receive mechanical rotary-type telephone dialing signals. The inter-pulse and make/break intervals are variable and are determined by the characteristics of the telephone system. As the digit keys are pressed on remote control unit 42 to dial a phone number, microcomputer 26 decodes the corresponding IR signal received and begins to dial by opening and closing relay 36 in telephone interface circuit 30 an appropriate number of times to coincide with the digit key pressed. An interdigit delay of 600 milliseconds is programmed into microcomputer 26 to allow for operation on slower telephone equipment such as the mechanical rotary-type. Microcomputer 26 mutes the sound during this opening and closing to prevent undesirable audio clicks from being heard over the television receivers's speaker. The pulse code shown in FIG. 4 represents the code for a telephone number having the initial 3 digits of "324".

Figure 5:
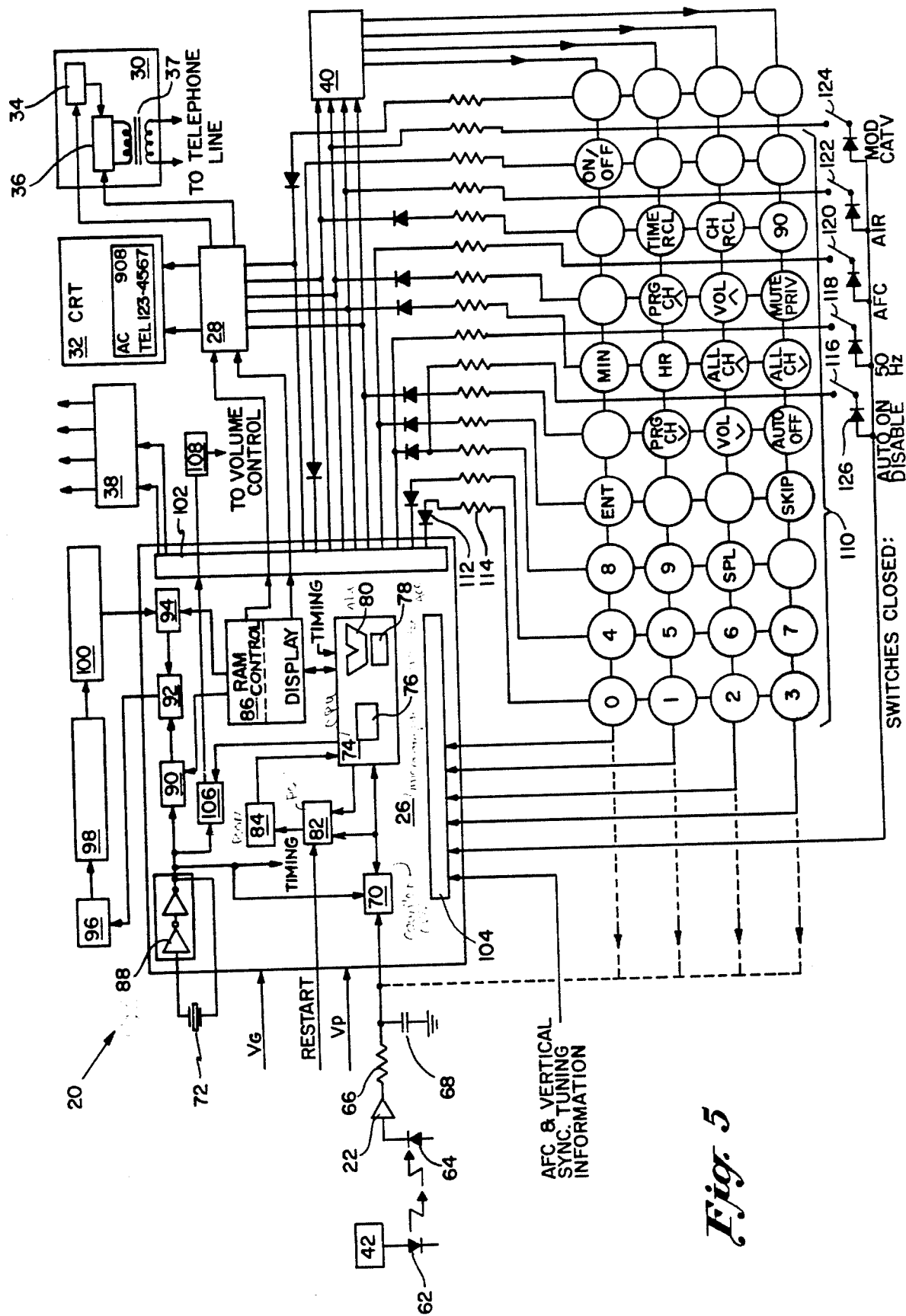
FIG. 5 is a detailed block diagram of a microcomputer-controlled television/telephone system in accordance with a preferred embodiment of the present invention.

A detailed block diagram of the microcomputer-controlled television/telephone system 20 of the present invention is shown in FIG. 5. Remote control transmitting unit 42 provides the pulse code modulated command signals to IR emitting diodes 62. In the preferred embodiment of the present invention three IR emitting diodes are utilized. The coded IR signals thus produced are transmitted to and received by a photo sensitive diode 64 connected to a conventional IR signal detector/amplifier 22. The squared output signal consists of the pulses which contain the serial data bits. These pulses are then transferred through a connector (not shown) to a noise removing RC filter comprised of resistor 66 and grounded capacitor 68 and then to microcomputer 26 for decoding. The decoding process is implemented by special hardware logic in microcomputer 26 and is controlled by the microcomputer software program contained in ROM (read only memory) 84.

The program hunts for the start data bit and expects to receive the remaining 10 bits described earlier. It samples past the tenth bit to ensure that the 10 bits received are valid and complete. If not, the sampling process is repeated with the decoding program ignoring invalid codes. If two keys on remote control unit 42 are pressed simultaneously, no IR signal is transmitted. When the data transmission has been decoded, microcomputer 26 activates the appropriate control outputs to achieve the desired control function. IR detector/amplifier 22 is powered whenever the television receiver is plugged in and the remote/manual switch (not shown) is in the remote position.

Microcomputer 26 is a four bit, E/D MOS integrated circuit with a ROM 84, a RAM 86, a central processing unit (CPU) 74, an input counter 70, and a program counter 82. Microcomputer 26 stores instructions and data, periodically updates the stored data, compares both stored and real-time data and makes decisions based upon these comparisons by means of logic instructions in providing system control. ROM 84 is a mask-generated, non-volatile, 4,096×8 bit memory matrix which includes 4,096 memory locations or "bytes" of 8 bits each. Program instructions and data are stored in ROM 84 which has a 79 instruction capacity. Eight bit binary patterns are used by ROM 84 from which instructions and data are sequentially removed under the control of program counter 82 in reading out each instruction to be executed for carrying out program functions. RAM 86 has an X-register, Y-register memory matrix organization for temporary memory storage of 256 words of 4 bits each. Each bit may be used as a flag to indicate whether a particular event has occurred or the individual flags can be used in combination in the form of a counter. When instructed, the contents of a directly addressed location in RAM 86 are transferred to accumulator 78 and the reverse process may also be accomplished by means of the proper instruction. RAM 86 organization may be broken up into a lower RAM map and an upper RAM map. The lower RAM map which is shown in Table I provides control of television receiver tuning, video display presentation and other functions related to television receiver operation. The upper RAM map which is shown in Table II is primarily involved with the telephone dial-out operation, the display of a dialed telephone number, and the timing involved in the AUTO-ON and AUTO-OFF functions.

TABLE I
LOWER RAM MAP

| X | Y | | 15 | 14 | 13 | 12 | 11 | 10 | 9 | 8 | 7 | 6 | 5 | 4 | 3 | 2 | 1 | 0 | Y | X |
|---|---|---|----|----|----|----|----|----|---|---|---|---|---|---|---|---|---|---|---|---|
| 7 | 1 | | Remote Tuning | Remote LOW Counter 2 | Remote LOW Counter 1 | Remote Error Counter | Remote Flag | Remote Pulse Seq. | Remote Current Code (LSD) | ⟨Remote⟩ Current Code (LSD) | MSD | | Temp Storage | Power | ⟨Keying data⟩ MSD | LSD | On Set Key Bounce | Every 20ms | 1 | 7 |
|   | 2 | | — | — | — | — | | | 2 | | | | | | | | | | 2 | |
|   | 4 | | — | — | — | — | | | ⟨VOLUME⟩ | | | | | | | | | | 4 | |
|   | 8 | | — | — | — | — | | | | Write Flag | | | | | | | | | 8 | |
| 6 | 1 | | | | | | | Pointer | Y-ADR | | | | | | | | | | 1 | 6 |
|   | 2 | | | | | | | | | | | | | | | | | | 2 | |
|   | 4 | | | | | | Counter | | | | | | | | ⟨Preferred CH MNOS Write Flag⟩ | | | | 4 | |
| 5 | 1 | | | Addresses Calculation Buffer | | | | | | | | | | | | | | | 8 | 5 |
|   | 2 | | | | X-ADR | Y-ADR | 38 | 34 | 30 | 26 | 22 | 18 | 14 | 80 | 76 | 72 | 68 | 64 | 1 | |
|   | 4 | | | | | | 39 | 35 | 31 | 27 | 23 | 19 | 15 | 81 | 77 | 73 | 69 | 65 | 2 | |
|   | 8 | | | | | | 40 | 36 | 32 | 28 | 24 | 20 | 16 | 82 | 78 | 74 | 70 | 66 | 4 | |
| 4 | 1 | | | | | | 41 | 37 | 33 | 29 | 25 | 21 | 17 | 83 | 79 | 75 | 71 | 67 | 8 | 4 |
|   | 2 | | 60 | 56 | 52 | 48 | 44 | 40 | | | | | | | | | | | 1 | |
|   | 4 | | 61 | 57 | 53 | 49 | 45 | 41 | | | | | | | | | 4 | 0 | 2 | |
|   | 8 | | 62 | 58 | 54 | 50 | 46 | 42 | | | 28 | | | | 12 | 8 | 5 | 1 | 4 | |
| 3 | 1 | | 63 | 59 | 55 | 51 | 47 | 43 | | 35 | | | | | | | 6 | 2 | 8 | 3 |
|   | 2 | | PLL | Key | | SD/P | | Key Mnt | ⟨Volume⟩ | | | | 45 sec. | | | | 7 | 3 | 1 | |
|   | 4 | | SEL | Job | Disp. | Tel. | Bit | Ch Charge | 10's | 1's | PO | Ten | Raster | 30 sec. | | | | Key | 2 | |
|   | 8 | | (2nd) | Flag | Mode | Raster Skip | | Key On | | | Disp. Counter | Key | Counter | | | | | | 4 | |
| 2 | 1 | | PLL SEL | Init I.D. | Recal Flash | Tel Dial | Tel I.D. | Tel Pulse | Clk Count | 1/5 or 1/6 | ⟨Now Time⟩ 1/10's | 1's | 10's | Sw 50/60 | 2255.625 MS Job Flag Pr Scan | 250.625 MS Root Flag | 50.125 MS | Counter Tel Input | 8 1 2 | 2 |
|   | 4 | | | | | | | | | | | | | | | | | | | |
|   | 8 | | | | | | | | | | | | | | | | | | | |
| 1 | 1 | | (LSD) | or D. Flag | Flag | Digit Counter | or D. Timer | Counter | Clk State | Disc 1 Input | Vsync High | Vsync Low | AFC OK | Select | Pr Chk. 1 sec. | | | Digit Counter | 4 8 | 1 |
|   | 2 | | PLL REF | PLL REF | PLL REF | MNOS | MNOS | On Mut Off Mut | — | — | Counter | Counter | Flag | AFC Step | AFC Timing | AFC Timer | AFC Timer | AFC Timer | 1 2 | |
|   | 4 | | (2nd) | Max | Min | E/W | E/W | Rdy Mut | — | — | | | | Counter | Count | Flag | 2 | 1 | 4 | |
| 0 | 1 | | PLL | | Auto On Burst | Flag | Counter Auto Off Burst | Sw Sw Bounce Buffer | — | — | Rev | Ch | Disp | Ch | | | UHF | Ch/Clock | 8 1 | 0 |
|   | 2 | | REF | Temp | | Temp | | | | | | | | | ⟨Temp⟩ | | Super | Med/Nom | 2 | |
|   | 4 | | (LSD) | | Momentary | | Momentary | | | | 1's | 10's | 1's | 10's | | | Mid HVAF | Air/Caty AFC/PLL | 4 8 | |
| X | Y | | 15 | 14 | 13 | 12 | 11 | 10 | 9 | 8 | 7 | 6 | 5 | 4 | 3 | 2 | 1 | 0 | Y | X |

TABLE II

UPPER RAM MAP

| X | Y | 15 | 14 | 13 | 12 | 11 | 10 | 9 | 8 | 7 | 6 | 5 | 4 | 3 | 2 | 1 | 0 | Y | X |
|---|---|----|----|----|----|----|----|---|---|---|---|---|---|---|---|---|---|---|---|
| 7 | 1 | — | — | — | — | — | — | — | — | — | 15 sec Tel A off | 15.3s Tel A off | 5.1s Tel A off | .32s Tel A off | 5.1s Tel Re-dial | 5.1s Tel Re-dial | .32s Tel Re-dial | 1 | 7 |
|   | 2 | — | — | — | — | — | — | — | — | — |   |   |   |   |   |   |   | 2 |   |
|   | 4 | — | — | — | — | — | — | — | — | — |   |   |   |   |   |   |   | 4 |   |
|   | 8 | — | — | — | — | — | — | — | — | — | Flag | Timer | Timer | Timer | Flag | Timer | Timer | 8 |   |
| 6 | 1 | — |   |   |   |   |   |   |   |   |   |   |   |   |   |   | — | 1 |   |
|   | 2 | — |   |   |   |   |   |   |   |   |   |   |   |   |   |   | — | 2 |   |
|   | 4 | — |   |   |   |   |   |   |   |   |   |   |   |   |   |   | — | 4 |   |
|   | 8 | — |   |   |   |   |   |   |   |   |   |   |   |   |   |   | — | 8 |   |
| 5 | 1 | — |   |   |   |   |   |   |   |   |   |   |   |   |   |   | — | 1 | 5 |
|   | 2 | — |   |   |   |   |   |   |   |   |   |   |   |   |   |   | — | 2 |   |
|   | 4 | — |   |   |   |   |   |   |   |   |   |   |   |   |   |   | — | 4 |   |
|   | 8 | — |   |   |   |   |   |   |   |   |   |   |   |   |   |   | — | 8 |   |
| 4 | 1 | — |   |   |   |   |   |   |   |   |   |   |   |   |   |   | — | 1 | 4 |
|   | 2 | — |   |   |   |   |   |   |   |   |   |   |   |   |   |   | — | 2 |   |
|   | 4 | — |   |   |   |   |   |   |   |   |   |   |   |   |   |   | — | 4 |   |
|   | 8 | — |   |   |   |   |   |   |   |   |   |   |   |   |   |   | — | 8 |   |
| 3 | 1 | — |   |   |   |   |   |   |   |   |   |   |   |   |   |   | — | 1 | 3 |
|   | 2 | — |   |   |   |   |   |   |   |   |   |   |   |   |   |   | — | 2 |   |
|   | 4 | — |   |   |   |   |   |   |   |   |   |   |   |   |   |   | — | 4 |   |
|   | 8 | — |   |   |   |   |   |   |   |   |   |   |   |   |   |   | — | 8 |   |
| 2 | 1 | — |   |   |   |   |   |   |   |   |   |   |   |   |   |   | — | 1 | 2 |
|   | 2 | — |   |   |   |   |   |   |   |   |   |   |   |   |   |   | — | 2 |   |
|   | 4 | — |   |   |   |   |   |   |   |   |   |   |   |   |   |   | — | 4 |   |
|   | 8 | — |   |   |   |   |   |   |   |   |   |   |   |   |   |   | — | 8 |   |
| 1 | 1 | Init | 15th Tel Digit | 14th Tel Digit | 13th Tel Digit | 12th Tel Digit | 11th Tel Digit | 10th Tel Digit | 9th Tel Digit | 8th Tel Digit | 7th Tel Digit | 6th Tel Digit | 5th Tel Digit | 4th Tel Digit | 3rd Tel Digit | 2nd Tel Digit | 1st Tel Digit | 1 | 1 |
|   | 2 | Tel |   |   |   |   |   |   |   |   |   |   |   |   |   |   |   | 2 |   |
|   | 4 | Redial |   |   |   |   |   |   |   |   |   |   |   |   |   |   |   | 4 |   |
|   | 8 | Flag |   |   |   |   |   |   |   |   |   |   |   |   |   |   |   | 8 |   |
| 0 | 1 | Auto on | <Now Time> | | Pm/Am | | | | <Auto Off> | | Pm/Am | | <Auto On> | | | Pm/Am | | 1 | 0 |
|   | 2 | A off flag |   |   |   |   |   |   |   |   | Run Trig |   |   |   |   |   | Run Trig | 2 |   |
|   | 4 |   | M | 10m | Hour |   | Day | M | 10m | Hour |   | M | 10m | Hour |   |   |   | 4 |   |
|   | 8 |   |   |   | Pwr Fail |   |   |   |   | Set/Not |   |   |   | Set/Not |   |   |   | 8 |   |
| X | Y | 15 | 14 | 13 | 12 | 11 | 10 | 9 | 8 | 7 | 6 | 5 | 4 | 3 | 2 | 1 | 0 | Y | X |

Information stored in RAM 86, which is a volatile memory is lost when the receiver is turned off. However, information stored in ROM 84 is not lost either when the receiver is turned off or when power is removed from the television receiver. When the television receiver is again turned on, the microcomputer program initializes RAM data from ROM 84 which causes the binary signals representing the first instruction stored in ROM 84 to be coupled to CPU 74 and causes various other portions of microcomputer 26 to be initialized for proper future operation when power is applied to microcomputer 26. For example, when the television receiver is turned on program counter (PC) 82 is initialized by means of a RESTART signal. Thus, the program proceeds to the initial instruction of the routine in ROM 84 and provides this instruction to CPU 74.

CPU 74 is made up of instruction decoder (ID) 76, accumulator (ACC) 78 and arithmetic and logic unit (ALU) 80. Instruction decoder 76 receives the instruction from ROM 84 provided to CPU 74 and, analyzes its contents, initiates ALU and ACC operations, and provides a control signal to program counter 82 which, in turn, directs the program to proceed to the next designated instruction in ROM 84. It is by means of this closed-loop instruction control system that ROM 84 provides the various controlling instructions to CPU 74 in carrying out the program stored in ROM 84. Accumulator 78 is a 4-bit register and is the primary working register of microcomputer 26. The contents of accumulator 78 derived from RAM 86 or earlier from ROM 84 are compared with instructional data of ROM 84 in ALU 80 with the results of these comparisons being stored in control bit locations in RAM 86. ALU 80 receives binary control signals from instruction decoder 76 and performs the required arithmetic and logic operations including addition, increment, boolean logic operations, straight transfer, etc.

Input counter 70 in microcomputer 26 is connected to the filter network comprised of resistor 66 and grounded capacitor 68 to receive the pulse coded input command signals from remote control unit 42. Input voltages $V_P$ of +5 VDC and $V_G$ of +8 VDC are provided for energizing microcomputer 26. Input counter 70 performs as a binary series of flip-flops to permit gated counting of input pulses interrupted by periodic analysis of these input pulses with the subsequent contents of input counter 70 being provided to accumulator 78 in CPU 74. The counted pulses are then compared in ALU 80 with stored pulse counts in RAM 86 and preset data in ROM 84. Based upon this comparison logic analysis command signals are provided by means of instruction decoder 76 in CPU 74 to program counter 82 in directing the program to desired instruction locations in ROM 84. In addition, this comparison and analysis in ALU 80 results in the output from CPU 74 to output register 102 of various output control signals to character generator 28. Also as a result of the comparisons and decisions made by ALU 80, data is transmitted from CPU 74 to RAM 86 where it is stored for further comparison with subsequent outputs from input counter 70. During this process ALU 80 is controlled by inputs from instruction decoder 76 which, in turn, is driven by various commands provided by ROM 84. This process is continued until all digits of the pulse coded telephone number transmitted by remote control unit 42 are received and stored in the designated control and display memory locations in RAM 86.

Microcomputer timing is provided by a series resonant device 72 both sides of which are connected to microcomputer 26 because of the high operating frequency of oscillator 72, i.e., 7.16 MHz. This permits most of the master clocking circuitry to be incorporated within microcomputer 26. One output of series resonant device 72 is coupled to the input of clock generator 88 with the other output of series resonant device 72 coupled to the output of clock generator 88. After processing, these clock pulses are provided to central processing unit 74 and to input counter 70 in its role of counting input pulses and detecting remotely generated control commands.

Also incorporated in microcomputer 26 is a phase lock loop (PLL) comprised of 12 bit reference counter 90, 11 bit programmable counter 94, phase detector 92 and tuner 98 together with its associated circuitry. In the present invention, indirect frequency synthesis is utilized in a conventional manner in which a PLL utilizes the tuner local oscillator (not shown) as its voltage controlled oscillator (VCO). In the PLL, the master timing control frequency of series resonant device 72 is divided by a multi-stage divider network, the programmable 12-bit reference counter 90, to provide a divided-down signal to phase comparator 92. The other input to phase comparator 92 is provided by the local oscillator of tuner 98. The frequency division chain from the local oscillator in tuner 98 to phase comparator 92 consists of a fixed divide by 256 prescaler 100 and a multi-stage 11 bit programmable divider or counter 94. The programmable portion of counter 94 divides by the numerical value of the frequency of the local oscillator in megahertz for the channel selected. The output of reference counter 90 provides a second input to phase comparator 92.

When the signal from programmable counter 94 and the signal from reference counter 90 to phase comparator 92 are exactly equal, the comparator output is 0. When there is any difference in these two frequencies, phase comparator 92 will develop an output which, when passed through low pass filter (LPF) 96, provides a correction voltage to varactor tuner 98 to change its local oscillator frequency until the two signals have exactly the same frequency. The tuner local oscillator then assumes the stability of series resonant device 72. This frequency comparison is done continually in order to compensate for tuner oscillator drift. The output of phase comparator 92 is a series of pulses the duty cycle of which is dependent on the difference between the reference frequency and the divided down local oscillator frequency. LPF 96 provides adequate filtering of the frequency correction signals so that there is no perturbation on the tuning line while allowing for a quick response to a new tuning voltage.

Digital-to-analog converter (DAC) 106 is driven by the output of resonant device 72 and is modulated by a control signal from CPU 74. The control signal from CPU 74 provides for the pulse width modulation (PWM) of the output of DAC 106. The duty cycle of the output of DAC 106 is thus controlled internally by the program stored in ROM 84 to provide a PWM output signal for volume control of the television receiver in the television mode of operation and the telephone speaker in the telephone mode of operation. The PWM signals from DAC 106 are provided to output latches 102 and thence to LPF 108 where this digital signal is integrated to provide a DC analog output signal for driving conventional volume control circuitry (not shown).

Additional tuning outputs are provided from RAM control memory locations to output latches 102 to provide proper band switching signals to band switching decoder 38. This permits the television receiver in the television mode of operation to tune to the proper band, e.g., VHF, UHF, CATV, or Superband, depending upon the channel number selected. In addition, automatic frequency control (AFC) and vertical synchronization information are provided to input latches 104 for television signal acquisition and tuning by means of tuning process steps stored in ROM 84 for controlling tuner 98.

When a desired telephone number is entered on the keyboard of remote control unit 42, the pulsed output of input counter 70 is provided to instruction decoder 76 in CPU 74. These received pulses are then temporarily stored in accumulator 78 and later compared in ALU 80 with program data recalled from ROM 84. When command inputs are received and verified by the program in microcomputer 26 as being valid commands, the individual commands, following program analysis in ALU 80, are stored in selected memory locations in RAM 86. This is a sequential process for as subsequent commands are detected by input counter 70 they are similarily stored in appropriate memory locations in RAM 86 until an entire legal code is detected by CPU 74 which sets a flag in a predetermined memory site in RAM 86. When the program later detects this flag in RAM 86 the stored command code is read from RAM 86 and provided to ALU 80 and to accumulator 78 from which it is transmitted to output latches 102. Thus, when a valid telephone command and telephone number dialing sequence is received by input counter 70 these command signals are eventually provided to output latches 102.

Figure 6:
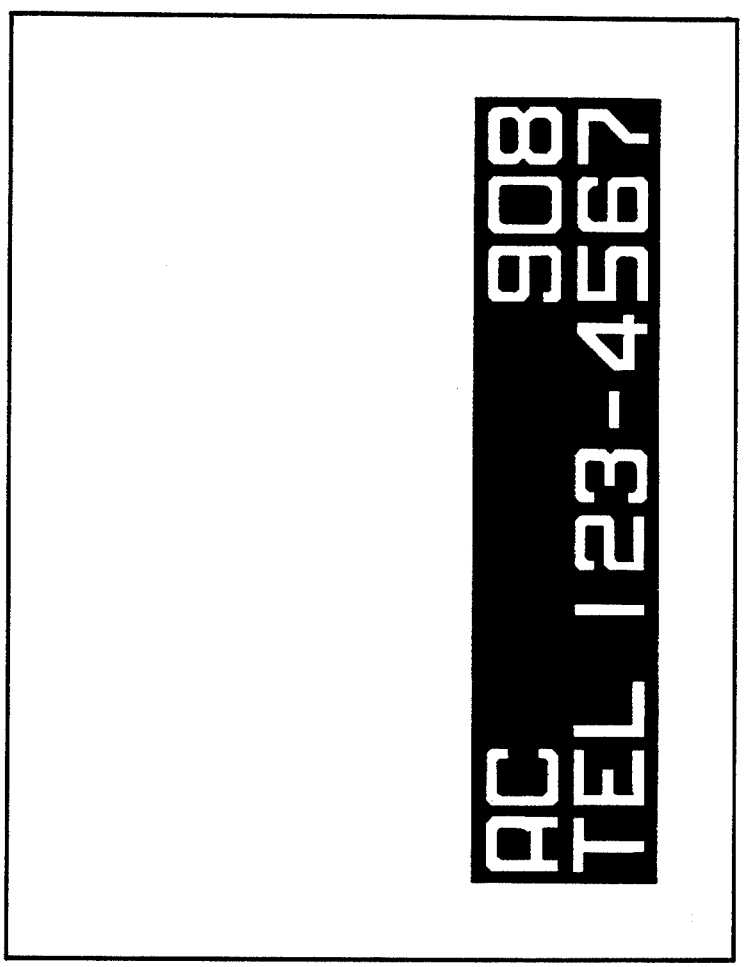
FIG. 6 shows a typical alpha-numeric display of a dialed telephone number presented on the television receiver's video display.

Output latches 102 of microcomputer 26 provides several outputs to character generator 28 including program control and alpha-numeric character display information. Any of the more conventional character generators may be used in the present invention as the particular design and operation of character generator 28 does not form a part of the present invention. In the preferred embodiment of the present invention, character generator 28 is an N-channel, LOCOS E/D MOS integrated circuit which is capable of providing a 60 character display having 5 rows of 12 characters each to video display 32. A video display character generator program is stored in a ROM (not shown) in character generator 28 which controls the processing of digital signals therein in accessing the 66 ram words stored in the available RAM (not shown) memory locations. When a 7 digit phone number is dialed, it is displayed in one row near the bottom of video display 32. The number is preceded by the letters "TEL" as shown in FIG. 6. Area codes when dialed for long distance calls are displayed on a second row above the previous row. These digits are preceded by the letters "AC". For overseas calls up to 15 digits can be displayed on-screen. If more than 15 digits are required, all digits will be dialed but only the last 15 will be displayed on video display 32. The phone number display can be removed from the screen by either waiting for a 30 second time out period programmed into microcomputer 26 or by depressing the ENTER button 60 twice on remote control transmitter 42. The present invention is not limited to the presentation of a dialed telephone number or time and channel number on a CRT-type of video display. Such information could equally as well be displayed on a great variety of displays, e.g., a light emitting diode (LED) display which presently is commonly used to display channel number. State of the art techniques could as easily permit the display of a dialed telephone number on an LED display. Driving an LED display directly by means of a microcomputer is presently well known in the art and in such a configuration character generator 28 would not be needed. Microcomputer 26 could directly drive a standard LED display or any number of other standard display devices.

The first RAM data location addressed provides the contents of the alpha-numeric character displayed in the first row at location 00 in the character generator RAM. The first dialed character would appear on line five in the lower right-hand corner and would proceed in a leftward direction as subsequent alpha-numeric characters are dialed. If an area code is dialed it will first appear on the bottom line and will be moved to the upper line once the local telephone number digits have been entered. The character generator 28 utilized in a preferred embodiment of the present invention is described in co-pending patent application Ser. No. 260,639, filed May 4, 1981, entitled "Character Generator With Latched Outputs", in the names of Jeffery Puskas, Peter C. Skerlos and Thomas J. Zato.

RAM location (3,12) in the lower RAM map shown in Table I contains the telephone control bit. Bit one of this RAM data word is designated SD/P and controls the privacy mode whereby the microphone on the television receiver is muted so that the other telephone subscriber is unable to hear conversations in the vicinity of telephone/television receiver 20. Bit 2 of this RAM data word is designated TEL and controls mode selection from telephone to television operation and vice versa. When telephone key 56 is selected, bit 2 of lower RAM memory location (3,12) is toggled. This change of state is read from RAM 86 and provided to the appropriate RAM address in character generator 28. Character generator 28, in turn, reads this RAM memory location and provides the appropriate output to telephone interface circuit 30. This output is designated "Telephone" in FIG. 5. Similarly, a "privacy" signal is provided to processing circuitry 34 in telephone interface circuit 30 when the MUTE/PRIVACY mode selector 58 is selected on remote control unit 42. If the MUTE/PRIVACY mode selector 58 is selected while in the television mode of operation the audio output from the television receiver is muted.

Character generator 28 provides 2 outputs to video display 32, a character output drive pulse and a background output drive pulse. Various inputs are provided to character generator 28 which are not shown in FIG. 5 such as horizontal and vertical synchronizing pulses in carrying out conventional "book-keeping" functions in driving video display 32.

Television receiver control in the television mode of operation is also provided by means of on-set keyboard 110. Microprocessor 26 scans on-set keyboard 110 in order to detect channel change, key closures and other control signal inputs provided by on-set keyboard 110 to input latches 104 of microcomputer 26. The various selector buttons indicated on on-set keyboard 110 are related to the television receiver mode of operation and will not be discussed further. A blocking diode 112 is positioned between each set of four selector buttons on keyboard 110 and microcomputer 26 to prevent microcomputer control signals to various television subsystems including MNOS memory IC 40 from reaching various selector buttons on keyboard 110 resulting in erroneous user inputs to input register 104. Similarly, resistors 114 located between each series of four selector buttons and microcomputer 26 are incorporated for limiting the current when a user input is made via on-set keyboard 110. MNOS programmable memory 40 is related only to the television mode of operation of the present invention and permits various television receiver operating commands to be stored in memory and recalled for future use in programming the television receiver. Inputs to programmable memory 40 are provided by the selector keys of on-set keyboard 110 and by microcomputer 26. Programmable memory 40 permits the user to program the preferred channels for the user's viewing area. Programmable memory 40 automatically is programmed with the last volume data in order to re-establish the last volume setting following the interruption of power to the television receiver. The operation and design of programmable memory 40 and the operation of keyboard 110 are conventional in nature and as such do not form a part of the present invention as they are related to television operation and consequently will not be further discussed. However, it is to be noted that while the present invention has been defined primarily in terms of the remote control of telephone/television receiver system 20, the present invention is not limited to such a configuration and could be easily converted to an on-set television/telephone control system by merely pulse code modulating the outputs of keyboard 110 and providing these outputs directly to input counter 70 as shown by the dotted lines in FIG. 5.

Several manual switches provide selective inputs to input latches 104 of microcomputer 26. The AUTO-ON DISABLE switch 116 when engaged disables the automatic television receiver programming functions provided by programmable memory 40 when it is loaded with inputs from either keyboard 110 or microcomputer 26. The 50 HZ switch 118 permits the television/telephone system 20 to operate from a 50 HZ frequency power supply system without degrading system clocking accuracy. A 50 HZ line frequency system is utilized by many countries around the world. AFC switch 120 when engaged permits the television receiver/telephone system 20 to operate in an automatic frequency control mode of operation. When AIR switch 122 is engaged the television receiver is capable of receiving normal VHF and UHF broadcast channels. With AIR switch 122 disengaged CATV channels may be received by the television receiver. MOD CATV switch 124 when engaged permits the television receiver to receive channels off-set from a nominal transmission frequency which may occur, for example, if a CATV station is utilizing the same channel as a VHF or UHF broadcast channel. This is frequently implemented in order to avoid interference between the cable and AIR television signals.

Figure 7:
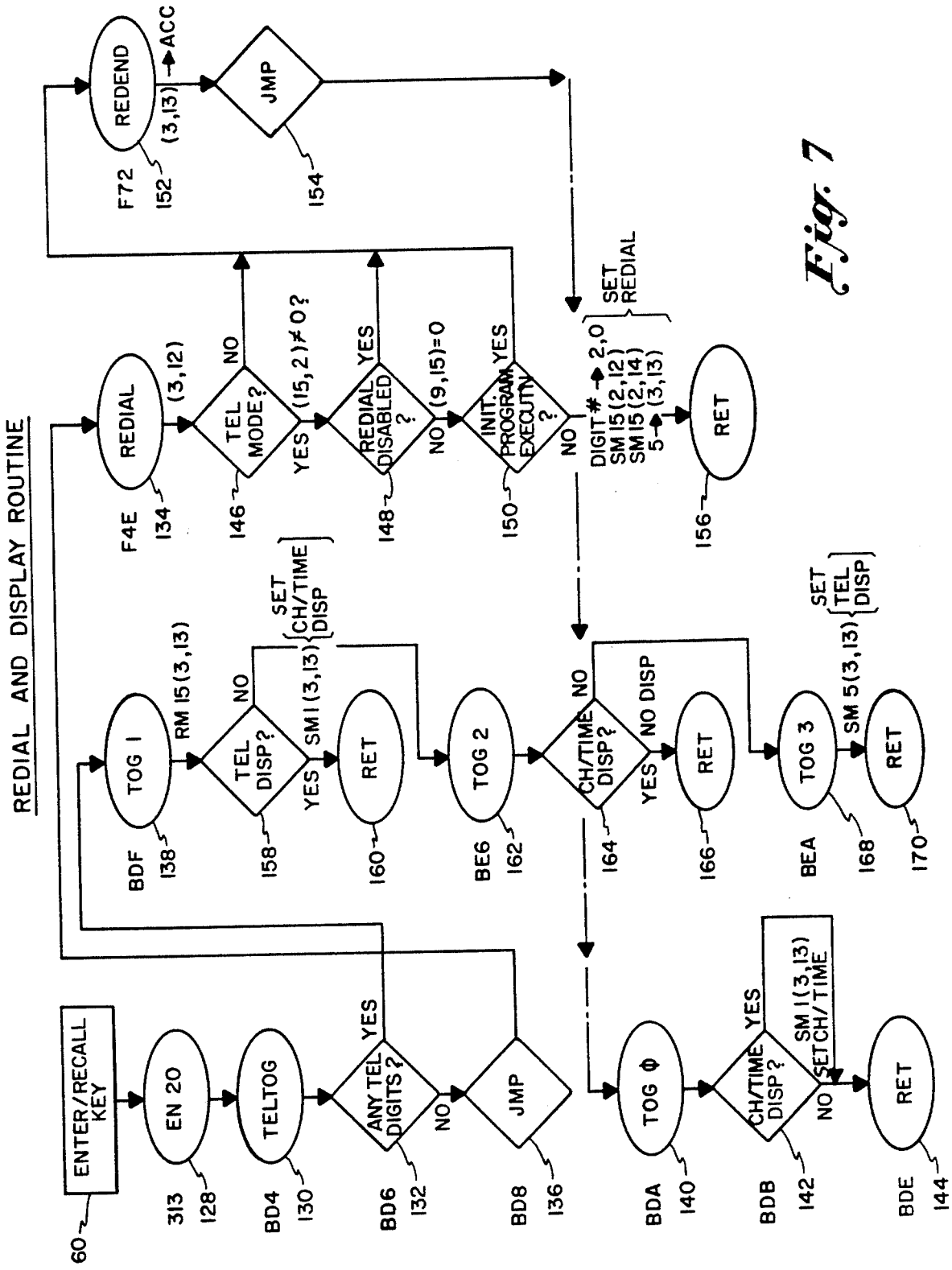
FIG. 7 shows the basic telephone number dialing and display sequence implemented by the microcomputer.
Figure 8A:
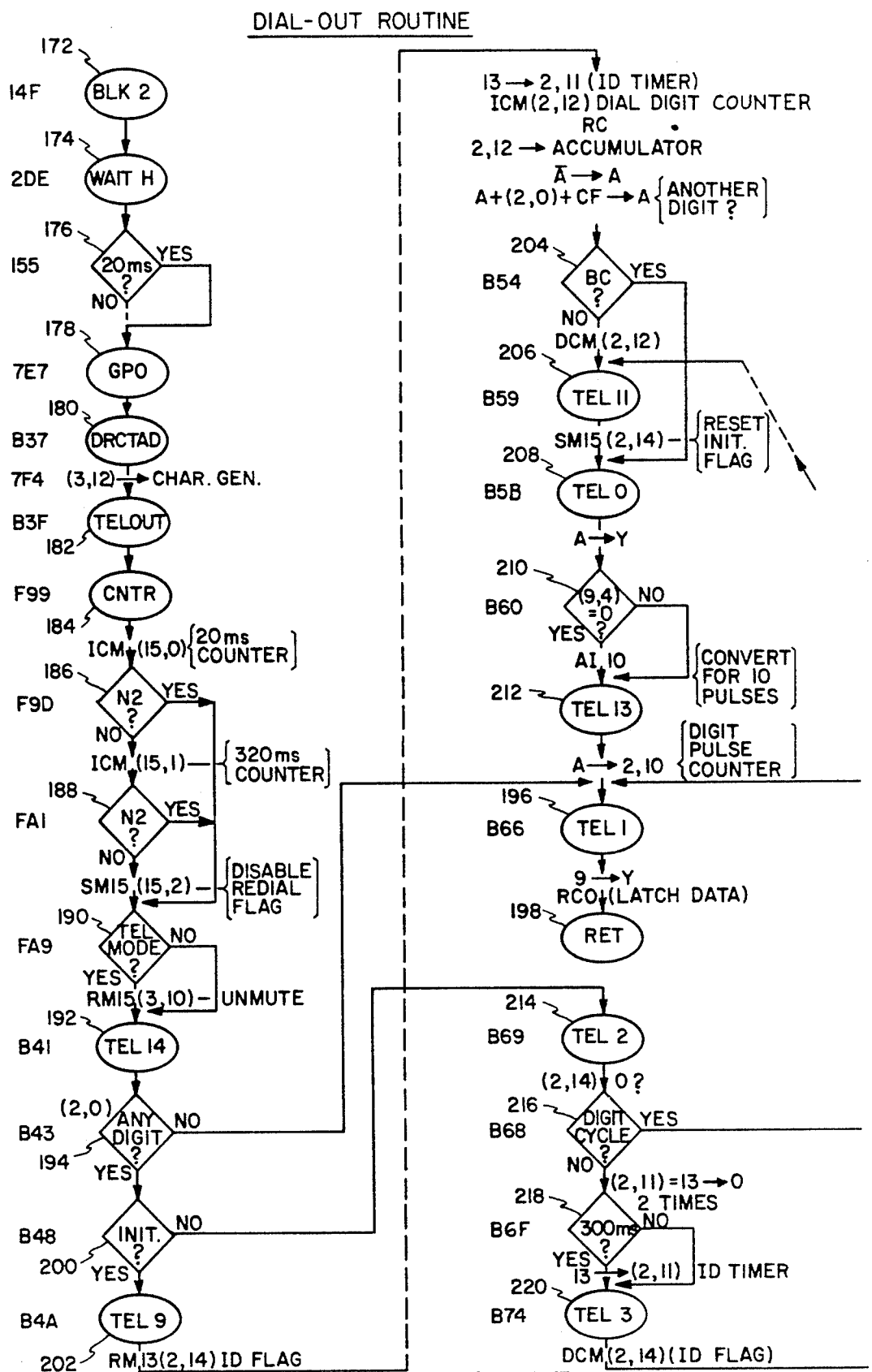
FIGS. 8A and 8B show the detailed telephone number dialing and display routine utilized in the microcomputer-controlled television/telephone system of the present invention.
Figure 8B:
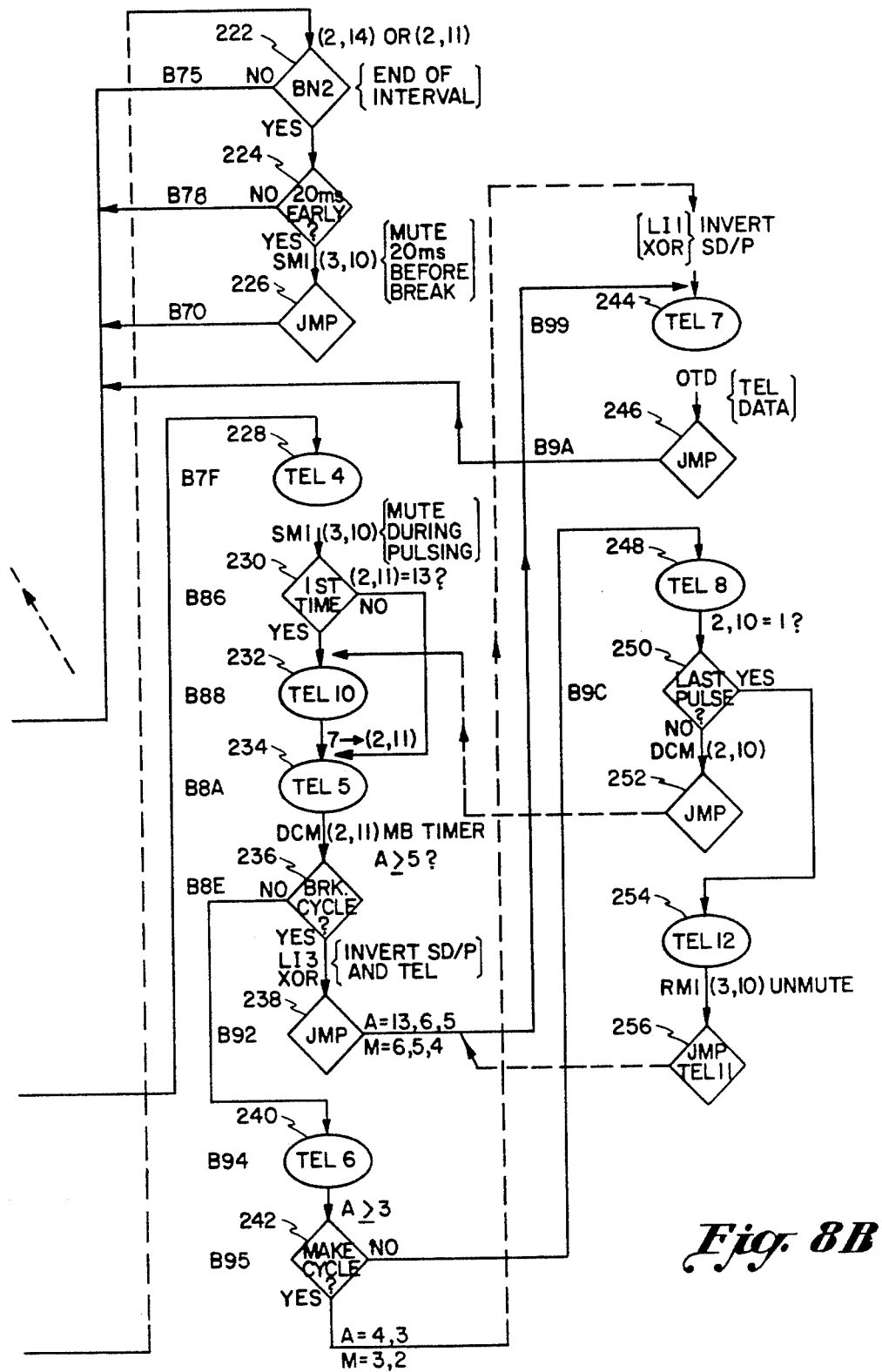

The manner in which digital signals are processed in telephone/television receiver 20 in providing a dialed telephone number to the telephone lines and displaying the dialed telephone number on the television receiver's video display 32 will now be explained with reference to the flow charts shown in FIGS. 7 and 8. FIG. 7 relates to the last telephone number dialed recall and redial routine and the alpha-numeric character display sequencing on the video display. FIG. 8 relates to the signal processing accomplished in microcomputer-controlled telephone/television receiver 20 in providing a pulsed output to the telephone lines during the dialing procedure. In referring to FIGS. 7 and 8A and 8B an oval symbol indicates an instruction or set of instructions resulting in the performance of a control function and a diamond symbol indicates a decision point based upon the comparison of binary signal inputs. The computer listing for the telephone number dial out, redial and display sequencing shown in FIGS. 7 and 8A and 8B is presented in Table III. Contained in this program assembly listing is such information as memory addresses, object code, statement number and additional source statement information. Detailed information on the symbology used in Table III is contained in the publication "MN 1400 Series: 4-Bit 1-Chip Microcomputer", published by Matsushita Electronics Corporation. RAM locations in which information and operating instructions essential to the computer listing of Table III are stored are listed in Table IV.

TABLE III

```
DIAL-OUT 10 LP
0B3F 4799    3515 TELOUT JMP    CNTR         DIAL OUT ••••••••••••••••••••••••••••••
0B41 0D      3514 TEL14  L
0B42 90      3515        CI     0             ANY DIGIT?
0B43 E366    3516        BZ     TEL1          N
0B45 6E      3517        LY     14            Y
0B46 0D      3518        L
0B47 9F      3519        CI     15            INIT?
0B48 E2C9    3520        BNZ    TEL2          N
0B4A 6E      3521 TEL9   LY     14            Y
0B4B CD      3522        RM     13            ID FLAG TO 2,14
0B4C 6B      3523        LY     11
0B4D 5D      3524        LI     13
0B4E 0B      3525        STIC                 ID TIMER TO 2,11
0B4F 2E      3526        ICM
0B50 2B      3527        RC
0B51 0D      3528        L                    DIGIT COUNTER 2,12
0B52 08      3529        CPL
0B53 60      3530        LY     C
0B54 07      3531        A                    ANOTHER DIGIT?
0B55 E55B    3532        BC     TELC          Y
0B57 6C      3533        LY     12            N
0B58 2F      3534        DCM
0B59 6E      3535 TEL11  LY     14
0B5A BF      3536        SM     15            RESET INIT FLAG
0B5B C3      3537 TELC   TAY
0B5C 59      3538        UPX
0B5D 31      3539        LX     1
0B5E CD      3540        L
0B5F 90      3541        CI     0             DIGIT = 0 ?
0B60 E263    3542        BNZ    TEL13         N
0B62 6A      3543        AI     10            Y - CONVERT FOR 10 PULSES
0B63 32      3544 TEL13  LX     2
0B64 6A      3545        LY     10
0B65 CA      3546        ST                   DIGIT PULSE COUNTER
0B66 69      3547 TEL1   LY     OCRT
0B67 16      3548        RCO
0B68 1F      3549        RET
0B69 6B      3550 TEL2   LY     11
0B6A 90      3551        CI     0             INTERDIGIT CYCLE OR DIGIT CYCLE?
0B6B E37F    3552        BZ     TEL4          DIGIT CYCLE
0B6D 0D      3553        L                    I.D. CYCLE
0B6E 90      3554        CI     0             300 MS TIMED OUT?
0B6F E274    3555        BNZ    TEL3          N
0B71 5D      3556        LI     13            Y
0B72 0A      3557        ST                   13 TO (2,11)
0B73 6E      3558        LY     14
0B74 2F      3559 TEL3   DCM
0B75 E266    3560        BNZ    TEL1
0B77 AE      3561        CY     14            20MSEC BEFORE BREAK?
0B78 E266    3562        BNZ    TEL1          N
0B7A 33      3563        LX     3
0B7B 6A      3564        LY     10
0B7C 81      3565        SM     1             SET MUTE
0B7D 4366    3566        JMP    TEL1
0B7F 33      3567 TEL4   LX     3
0B80 6A      3568        LY     10
0B81 81      3569        SM     1             MUTE

0B82 32      3570        LX     2
0B83 6B      3571        LY     11
0B84 0D      3572        L
0B85 9D      3573        CI     13            1ST TIME?
0B86 E28A    3574        BNZ    TEL5          N
0B88 57      3575 TEL10  LI     7             Y
```

TABLE III (cont.)

```
0B89 0A     3576           ST              DIGIT BREAK-MAKE TIMER TO (2,11)
0B8A 2F     3577 TEL5      DCM
0B8B 33     3578           LX    3
0B8C 6C     3579           LY    12
0B8D 95     3580           CI    5           BREAK CYCLE?
0B8E E494   3581           BNC   TEL6        N - LESS THAN 5
0B90 53     3582           LI    3           Y - 5 OR MORE
0B91 06     3583           XOR               INVERT SD/P & SPCL#1
0B92 4399   3584           JMP   TEL7
0B94 93     3585 TEL6      CI    3           MAKE CYCLE?
0B95 E49C   3586           BNC   TEL8        N - 2 OR LESS
0B97 51     3587           LI    1           Y
0B98 06     3588           XOR               INVERT SD/P
0B99 12     3589 TEL7      OTD
0B9A 4366   3590           JMP   TEL1
0B9C 32     3591 TEL8      LX    2
0B9D 6A     3592           LY    10
0B9E 0D     3593           L
0B9F 91     3594           CI    1           LAST PULSE?
0BA0 E3A6   3595           BZ    TEL12       Y
0BA2 2F     3596           DCM               N
0BA3 6B     3597           LY    11
0BA4 4388   3598           JMP   TEL10
0BA6 33     3599 TEL12     LX    3
0BA7 C1     3600           RM    1           UNMUTE
0BA8 32     3601           LX    2
0BA9 4359   3602           JMP   TEL11
0BAB 1F     3603 ADJE      RET
            3654 *                           ***********************************
            3655 *
0BD4 33     3656 TELTOG    LX    3
0BD5 6D     3657           LY    13
0BD6 E2DF   3658           BNZ   TOG1        TEL MODE W/ DIGITS
0BD8 474E   3659           JMP   REDIAL
0BDA CF     3660 TOG0      RM    15
0BDB E3DE   3661           BZ    TOGE        Y
0BDD B1     3662           SM    1           N
0BDE 1F     3663 TOGE      RET
0BDF 0D     3664 TOG1      L
0BE0 95     3665           CI    PRDP        TEL DISP?
0BE1 CF     3666           RM    15
0BE2 E2E6   3667           BNZ   TOG2        N
0BE4 B1     3668           SM    1           Y
0BE5 1F     3669           RET
0BE6 91     3670 TOG2      CI    NOMDP       CH DISP?
0BE7 E2EA   3671           BNZ   TOG3        N
0BE9 1F     3672           RET
0BEA B5     3673 TOG3      SM    5
0BEB 1F     3674           RET
            3675 **********              *******                       *******
0F02 32     4393 TELRAM    LX    2
0F03 60     4394           LY    0
0F04 0D     4395           L               NON-ZERO DIGIT POINTER?
0F05 E20C   4396           BNZ   TEL30     NOT 1ST TIME

0F07 6E     4397           LY    14
0F08 BF     4398           SM    15        1ST TIME FLAG TO I.D.
0F09 6C     4399           LY    12
0F0A BF     4400           SM    15        1ST TIME FLAG TO DIGIT POINTER
0F0B 60     4401           LY    0
0F0C 39     4402 TEL30     UPX
0F0D 31     4403           LX    1
0F0E E228   4404           BNZ   TEL45     NOT 1ST TIME
0F10 CF     4405 TEL35     RM    15        1ST DIGIT - INITIALIZE
0F11 BE     4406           SM    14        NON-DIGIT & 1227 BLANK CODE
0F12 2C     4407           ICY
0F13 E210   4408           BNZ   TEL35
0F15 02     4409           TYA
0F16 81     4410           AI    1
0F17 27     4411           STD   3         RAM DIGIT POINTER
0F18 22     4412 TEL40     LD    2         LSD KEYBOARD DIGIT DATA
0F19 0A     4413           ST              LSD TO (9,0)
0F1A 23     4414           LD    3
0F1B 90     4415 TEL60     CI    0         MORE THAN 15 DIGITS?
0F1C E225   4416           BNZ   TEL70     N
0F1E 2D     4417           DCY             Y - ERASE MSD
0F1F 5E     4418           LI    14
0F20 0B     4419           STIC
0F21 32     4420           LX    2
0F22 6C     4421           LY    12
0F23 2F     4422           DCM             DEC DIAL OUT COUNTER
0F24 1F     4423           RET
0F25 32     4424 TEL70     LX    2
```

TABLE III (cont.)

```
0F26  0A      4425         ST                RAM DIGIT POINTER
0F27  1F      4426         RET
0F28  0E      4427  TEL45  LIC               GET RAM DATA
0F29  9E      4428         CI    14          NON-DIGIT?
0F2A  E228    4429         BNZ   TEL45       NO
0F2C  02      4430         TYA
0F2D  27      4431         STD   3           SAVE DIGIT POINTER
0F2E  2D      4432         DCY               YES
0F2F  2D      4433         DCY               POINT TO MSD IN RAM
0F30  0E      4434  TEL50  LIC               GET RAM DATA
0F31  0C      4435         STDC              SHIFTED LEFT
0F32  2D      4436         DCY               POINT TO NEXT DIGIT
0F33  AF      4437         CY    15          PASSED Y=0?
0F34  E230    4438         BNZ   TEL50       NO
0F36  2C      4439         ICY               POINT TO Y=0
0F37  4718    4440         JMP   TEL40       STORE LAST ENTRY
              4441  **
0F39  02      4442  TOUT1  TYA               SAVE Y POINTER
0F3A  69      4443  TOUT2  LY    OCRT
0F3B  17      4444         SCO
0F3C  B0      4445         SM    0
0F3D  16      4446         RCO
0F3E  C3      4447         TAY
0F3F  1F      4448         RET
              4449  *
              4450  **********
0F4E  6C      4464  REDIAL LY    12
0F4F  0D      4465         L
0F50  D2      4466         TB    2           TEL MODE?
0F51  E372    4467         BZ    REDEND      N
0F53  39      4468         UPX
0F54  37      4469         LX    7
0F55  62      4470         LY    2           5 SECONDS ELAPSED?
0F56  0D      4471         L                 Y
0F57  E272    4472         BNZ   REDEND
0F59  39      4473         UPX
0F5A  31      4474         LX    1
0F5B  6F      4475         LY    15          INIT?
0F5C  0D      4476         L                 Y
0F5D  E372    4477         BZ    REDEND
0F5F  2D      4478  RED1   DCY
0F60  0D      4479         L                 TEL DIGIT?
0F61  9E      4480         CI    14          N
0F62  E35F    4481         BZ    RED1        Y
0F64  02      4482         TYA
0F65  61      4483         AI    1
0F66  32      4484         LX    2
0F67  60      4485         LY    0
0F68  0A      4486         ST                RAM DIGIT POINTER
0F69  6C      4487         LY    12
0F6A  BF      4488         SM    15          DIAL DIGIT POINTER
0F6B  6E      4489         LY    14
0F6C  BF      4490         SM    15          I.D. INIT FLAG
0F6D  33      4491         LX    3
0F6E  6D      4492         LY    13
0F6F  55      4493         LI    5
0F70  CA      4494         SI                TEL DISP
0F71  1F      4495         RET
0F72  33      4496  REDEND LX    3
0F73  6D      4497         LY    13
0F74  0D      4498         L
0F75  91      4499         CI    NCMDP       CH & TIME DISP?
0F76  43DA    4500         JMP   TOGO
```

TABLE IV

| RAM LOCATION | INFORMATION/FUNCTION CONTENT |
|---|---|
| (2,0) | Telephone Input Digit Counter, 0 or 1 → 15 |
| (2,10) | Telephone Pulse Counter, 14 or 10 → 1 |
| (2,11) | Telephone Inter-digit/Digit Timer |
| (2,12) | Dial Digit Counter |
| (2,14) | Initialization, Inter-digit or Digit Flag |
| (9,0) → (9,14) | Digits |
| (9,15) | No Last Number Flag |
| (15,0) | Redial Enable Timer; Every 20 msec. |
| (15,1) | Redial Enable Timer; Every 320 msec. |
| (15,2) | Redial Disable Flag; After 5.1 sec. |

Referring to FIG. 7, the re-dial and display sequence is initiated by selecting the ENTER/RECALL key 60 on remote control unit 42. If the system is in the television mode of operation the channel number tuned to and the time will be recalled from the microcomputer's RAM 86 and presented on video display 32. If the system is in the telephone mode of operation, i.e., the telephone selector 56 has been selected, the program proceeds to the EN20 label 128 in the program listing to execute the re-dial operation or to operate the various displays. A program next proceeds to TELTOG 130 which is a mnemonic designating the toggling of the video display. The program next determines whether any telephone digits have been entered 132. If no telephone digits have been entered the program jumps 136 to redial label 134. If telephone/television receiver system 20 is not in the telephone mode of operation the program proceeds to the re-dial end routine 152. If the check of RAM memory location (3,12) indicates that telephone/television receiver system 20 is in the telephone mode the program proceeds to check if the redial routine has been disabled 148. If ENTER/RECALL key 60 is not selected within 5 seconds of telephone mode selection the re-dial operation will not be initiated 148.

If the ENTER/RECALL key 60 has been selected within 5 seconds of the selection of the telephone mode of operation and no digits have been entered during this period the program proceeds to decision point 150. The re-dial mode is disabled when the television receiver is turned off following the dialing of a telephone number so as to preclude a redialing of that same number when the television receiver is once again turned on. Thus, the redial disable routine 150 eliminates the possibility of inadvertently dialing an unwanted number by selecting the ENTER/RECALL key 60. If the re-dial routine has been disabled the program proceeds to the re-dial end routine 152.

If the program determines at step 150 that it is not in the initial time through the redial routine since the television receiver was initially turned on the program recalls from RAM memory location (2,0) the digit counts entered, resets in location (2,12) the counts digits outputted, and resets the inter-digit or digit flag at memory location (2,14). In addition, the video display mode control bit (3,13) is programmed to display the telephone number which is to be re-dialed. Following this automatic re-dialing sequence the re-dial and display subroutine returns to the main computer program which controls television receiver and telephone operation.

If under any of the aforementioned conditions, the program proceeds to the re-dial end routine 152 the contents of display mode control memory location (3,13) are loaded into accumulator 78 and the program jumps 154 to the "TOG 0" routine 140. The "TOG 0" sub-routine starting at 140 toggles the video display and by recalling the contents of display mode control (3,13) in providing these contents to accumulator 78 the prior state of the video display can be determined from which the state to be toggled to is ascertained. If it is determined from the contents of RAM memory location (3,13) that the channel number and time was currently being presented on video display 32, the program blanks the display of this information and executes a return 144 to the general television receiver/telephone computer program. If by means of this toggle function it is determined that the display is blank, the contents of RAM location (3,13) are set to display channel number and time information with the program then returning to the main computer program.

If in step 132 the program detects the entry of telephone number digits the program proceeds to "TOG 1" 138 in order to either display a dialed telephone number, channel number and time, or to display nothing. Thus, step 158 involves the determination of whether or not a telephone number is being displayed on the video display 32. If the dialed telephone number is on display the program changes the display to channel and time and then returns to the main computer program. Otherwise the program proceeds to "TOG 2" and then checks to determine if channel number and time are being displayed 164 and if they are not being displayed proceeds to "TOG 3" 168 where the video display is reset to display the dialed telephone number prior to returning to the main computer program 170. If in step 164 it is determined that the channel number and time is being displayed, the program returns to the main computer program with a blank display. The net result is a closed loop type of operation of telephone number display, followed by time and channel number display, then a blank display, returning to telephone number display, etc.

FIGS. 8A and 8B show the detailed telephone number dialing and display routine utilized in microcomputer-controlled television/telephone system 20. "Block 2" 172 refers to the particular portion of the general computer program which involves the dial-out function. The general computer program proceeds through each individual processing block every 10 milliseconds. The program initially waits for the start of a three millisecond interval of time 174. Once detected 176, the program proceeds to the general purpose output section 178 of character generator 28. The GPO subroutine 178 represents the setting out of the actual address of the RAM location in character generator 28 where the dialed telephone number will be temporarily stored. The program then establishes a direct address 180 in the RAM of character generator 28 and reads the contents of (3,12) in the RAM of microcomputer 26 and provides this information to the previously described location in the character generator's RAM. The reading out of the information in microcomputer RAM location (3,12) is accomplished in the steps following 182. Steps 184, 186 and 188 involve the incrementing of microcomputer RAM counters in locations (15,0) and (15,1). The two counters involved are a 320 msec counter and a 5.1 second counter. If the program does not detect the entry of a re-dial signal within 5.1 seconds of telephone mode actuation, the DISABLE RE-DIAL FLAG is actuated and the re-dial function is no longer available. The program then determines whether the system is in the telephone mode of operation 190, and if in the telephone mode, the program clears RAM memory location (3,10) in order to unmute the system.

The program next proceeds to "TEL 14" 192 where it checks to see if any digits have been entered 194 in RAM memory location (2,0). If no digit has been entered the program proceeds to "TEL 1" 196 and then returns 198 to the general computer program which controls television/telephone receiver 20. If the entry of digits is detected at step 194, the program proceeds to an initialization subroutine 200 where at "TEL 9" 202 the program initializes program timing data and system timers in order to start the sequence of operations involved in the dial-out function. This includes the resetting of the contents of RAM location (2,14), the initiation of inter-digit timing, and the counting of dialed digits by means of incrementing RAM location (2,12). This portion of the program, by sequentially storing and recalling dialed numbers from various RAM locations, permits the high speed digital entry of dialed numbers to be compatible with the slower rotary type of mechanical dialing system. Thus, the digits may be dialed at any speed, but provided to the mechanical dialing system at a much slower rate. In addition, while any number of digits may be selected in dialing a telephone number, only the last 15 digits dialed will be presented on video display 32 and only 15 digits will be available in memory for the re-dial function.

The program next executes a branch carry function 204 in comparing the number of digits output by the microcomputer 26 to the number of digits provided to the microcomputer. Here the system determines if the number of digits provided to the telephone system is equal to the number of digits dialed. The program then branches to "TEL 0" 208 and resets the initialization flag in RAM location (2,14). Once the number of digits output is found to equal the number of digits dialed, the system ceases to provide digits to the telephone lines. If the program detects that not all digits dialed have been provided to the telephone lines, a decrementing process is executed in order to permit all dialed digits to be provided to the telephone lines with the program proceeding to "TEL 11" 206 and resets the initialization flag at (2,14). The program then proceeds to "TEL 0" 208 and initiates a digit incrementing process 210 to accomodate the unique manner in which the number "0" is provided to the telephone system following the dialing process. The program next proceeds to "TEL 13" 212 where the contents of accumulator 78 are stored in RAM memory location (2,10) which is the pulse counter where the entered digit number is decremented in counting the individual digits entered. The program next proceeds to "TEL 1" 196 where the contents of RAM memory location (3,12) are output after the DRCTAD 180 contents are latched into character generator 28. The program then returns to the main computer program 198.

At this point in the program microcomputer 26 has been initialized to receive the first telephone number entry and the first digit of the desired telephone number has been dialed. After the dial-out routine has returned to the main computer program at step 198, "BLOCK 2" 172 will be re-entered 10 milliseconds after the sub-routine has returned to the general computer program. The routine will then proceed to "TEL 14" 192, as previously described, where the entry of a telephone digit is detected 194. The data input routines used herein do not form a part of the present invention as any of the more commonly known input latching routines could be utilized. If it is not the initial time through the program control loop, the program branches to "TEL 2" 214. The program then determines based upon the contents of RAM memory location (2,14) whether or not the program is in a digit cycle 216. If the program determines that it is not in a digit cycle, it incorporates the 600 millisecond inter-digit interval by decrementing the contents of (2,11) in RAM in steps 218 and 220. The program next checks to see if it has arrived at the end of the inter-digit interval 222 and if not, branches back to "TEL 1" 196. If the program detects the end of the inter-digit interval 222, it checks to see if it is 20 milliseconds prior to the start of the break cycle 224 in order to mute the volume during the break cycle to avoid transmitting the loud clicking sounds produced during the dialing process. The program then proceeds back to "TEL 1", as it does if the 20 milliseconds prior to the break interval is not detected at 224, and proceeds to the general computer program.

If a digit cycle is detected at 216, the program proceeds to "TEL 4" 228 where it begins controlling the make-and-break outputs. Initially the program provides a mute signal to (3,10) in RAM which provides for the muting of volume during the dialing sequence. The program then looks at the contents of (2,11) to determine if it's the first time in the dialing process 230. If it determines that it is the first digit which has just been dialed the program loads a 7 into (2,11) at "TEL 10" 232 to start the digit timer and initialize the dialing process. The program then proceeds to "TEL 5" 234 as it also does if it determines at 230 that it is not the first time that the digit interval has been entered. At "TEL 5" 234 the contents of (2,11) are decremented and the decremented contents are then compared with the number 5 and so long as the contents of (2,11) is at least 5 the program will continue the break cycle to permit the continued dialing of the desired telephone number. The contents of (3,12) are inverted if the program detects a break cycle resulting in the signal provided to character generator 28 by microcomputer 26 being inverted causing relay 36 to be turned off which initiates the break cycle.

At "TEL 7" 244 the program executes an output data instruction in which data is taken from accumulator 78 and transmitted to character generator 28. Following the output of this data the program jumps 246 to "TEL 1" 196.

If the program detects at 236 that it is not in a break cycle the program proceeds to "TEL 6" 240 to detect if it is in a make cycle 242. If it detects that it is in a make cycle it proceeds to "TEL 7" 244 and outputs the contents of accumulator 78 to character generator 28. If it determines at step 242 that it is in neither a make cycle nor a break cycle the program proceeds to "TEL 8" 248. The program then looks at the contents of RAM memory location (2,10) to determine if the last pulse has been received. If it determines that the last pulse has not been received the program decrements the contents of (2,10) and jumps 252 to "TEL 10" 232. This permits the break cycle to be repeated for a 60 msec interval three times and the make cycle to be repeated for a 40 msec interval two times until the last pulse is detected at step 250. "TEL 10" 232 permits the re-initialization of the make-break counter so that the number 7 is stored back in (2,11) which is immediately decremented to 6 permitting the break cycle to be traversed 3 times and the make cycle to be traversed 2 times. Once the last pulse has been detected 250 the program brances to "TEL 12" 254 where the audio is unmuted during the non-dialing periods and is muted only during the dial cycle in order to avoid the transmission of the audio clicks from the television receiver's loudspeaker. This is accomplished by re-setting the mute data contents of RAM location (3,10). Following this unmuting step the program jumps 256 to "TEL 11" 206 where the initialization flag is reset by resetting the contents of RAM location (2,14). The desired telephone number has thus been dialed and the telephone/television receiver 20 has been re-initialized to accept the next dialed telephone number.

There has thus been provided a telephone/television receiver system by means of which incoming telephone calls may be answered and outgoing telephone calls may be dialed in a telephone mode of operation while conventional television viewing is available in a television mode of operation. The system makes use of a microcomputer which controls not only television receiver tuning but also the signals provided to the telephone lines in dialing a desired telephone number. The microcomputer drives a character generator which not only provides for the display of a dialed telephone number, but also provides the dialing outputs to conventional switching circuitry which interfaces with the telephone lines.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation the actual scope of the invention is intended to be defined in the following claims when viewed in their proper perspective against the prior art.

We claim:

1. In a television receiver for receiving a transmitted composite video signal having a video component and an audio component and having a tuner for selectively tuning said television receiver from a currently tuned channel to a desired channel, said television receiver including a video display and audio signal processing circuitry including audio amplifier-speaker means, a system for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

remotely located control means having a plurality of selectable keys for generating binary signals representing channel numbers and alpha-numeric telephone number characters;

mode selection means coupled to said remote control means for generating a modulated signal, said modulated signal representing the telephone mode of operation of said television receiver;

microcomputer means coupled to said remotely located control means and said mode selection means for receiving said binary signals and said modulated signal and for generating a plurality of binary addresses for outputting a plurality of digital dialing words corresponding to alpha-numeric telephone number characters and a telephone switch signal, respectively, or for generating a plurality of binary addresses for outputting a plurality of digital tune words corresponding to a selected channel number from a memory matrix containing a plurality of said digital dialing and digital tune words to said tuner in tuning from a currently tuned channel to a desired channel when said modulated signal is not received; and switching circuit means coupled to said microcomputer means for receiving said telephone switch signal and said digital dialing words and to said audio amplifier-speaker means, said microphone means and said telephone for providing said digital dialing words to said telephone following the receipt of said telephone switch signal for initiating a telephone call and coupled to said television receiver audio signal processing circuitry for answering a telephone call and for carrying on audio communication on said telephone by means of said television receiver.

2. In a television receiver for receiving a transmitted composite video signal having a video component and an audio component and having a tuner for selectively tuning said television receiver from a currently tuned channel to a desired channel, said television receiver including a video display and audio signal processing circuitry including audio amplifier-speaker means, a system for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

remotely located control means having a plurality of selectable keys for generating binary signals representing channel numbers and alpha-numeric telephone number characters;

mode selection means coupled to said remote control means for generating a modulated signal, said modulated signal representing the telephone mode of operation of said television receiver;

microcomputer means coupled to said remotely located control means and said mode selection means for receiving said binary signals and said modulated signal and for generating a plurality of binary addresses for outputting a plurality of digital dialing words corresponding to alpha-numeric telephone number characters and a telephone switch signal, respectively, or for generating a plurality of binary addresses for outputting a plurality of digital tune words corresponding to a selected channel number from a memory matrix containing a plurality of said digital dialing and digital tune words to said tuner in tuning from a currently tuned channel to a desired channel when said modulated signal is not received;

character generator/control means coupled to said microcomputer means for receiving said telephone switch signal and said digital dialing words and coupled to said video display for providing said digital dialing words thereto for the presentation of the dialed alpha-numeric telephone number characters on said video display; and switching circuit means coupled to said character generator/control means for receiving said telephone switch signal and said digital dialing words and to said audio amplifier-speaker means, said microphone means and said telephone for providing said digital dialing words to said telephone following the receipt of said telephone switch signal for initiating a telephone call and coupled to said television receiver audio signal processing circuitry for answering a telephone call and for carrying on audio communication on said telephone by means of said television receiver.

3. A telephone-television receiver system as in claim 1 further comprising audio switch control means coupled to said remotely located control means for providing an audio control signal to said microcomputer means for recalling a privacy signal from said memory matrix and providing said privacy signal to said switching circuit means for selectively electrically decoupling said microphone means from said television receiver in the telephone mode of operation.

4. A telephone-television receiver system as in claim 3 wherein said microcomputer means provides a timed signal to said audio amplifier-speaker means by means of a said switching circuit means for selectively muting said audio amplifier-speaker means during telephone number dialing thus preventing the transmission by said audio amplifier-speaker means of break-and-make mechanical dialing sounds.

5. In a television receiver for receiving a transmitted composite video signal having a video component and an audio component and having a tuner for selectively tuning said television receiver from a currently tuned channel to a desired channel, said television receiver including a video display and audio signal processing circuitry including audio amplifier-speaker means, a system for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

on-set control means located on said television receiver having a plurality of selectable keys for generating binary signals representing channel numbers and alpha-numeric telephone number characters;

mode selection means coupled to said on-set control means for generating a modulated signal, said modulated signal representing the telephone mode of operation of said television receiver;

microcomputer means coupled to said on-set control means and said mode selection means for receiving said binary signals and said modulated signal and for generating a plurality of binary addresses for outputting a plurality of digital dialing words corresponding to alpha-numeric telephone number characters and a telephone switch signal, respectively, or for generating a plurality of binary addresses for outputting a plurality of digital tune words corresponding to a selected channel number from a memory matrix containing a plurality of said digital dialing and digital tune words to said tuner in tuning from a currently tuned channel to a desired channel when said modulated signal is not received; and switching circuit means coupled to said microcomputer means for receiving said telephone switch signal and said digital dialing words and to said audio amplifier-speaker means, said microphone means and said telephone for providing said digital dialing words to said telephone following the receipt of said telephone switch signal for initiating a telephone call and coupled to said television receiver audio signal processing circuitry for answering a telephone call and for carrying on audio communication on said telephone by means of said television receiver.

6. In a television receiver for receiving a transmitted composite video signal having a video component and an audio component and having a tuner for selectively tuning said television receiver from a currently tuned channel to a desired channel, said television receiver including a video display and audio signal processing circuitry including audio amplifier-speaker means, a system for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

on-set control means located on said television receiver having a plurality of selectable keys for generating binary signals representing channel numbers and alpha-numeric telephone number characters;

mode selection means coupled to said on-set control means for generating a modulated signal, said modulated signal representing the telephone mode of operation of said television receiver;

microcomputer means coupled to said on-set control means and said mode selection means for receiving said binary signals and said modulated signal and for generating a plurality of binary addresses for outputting a plurality of digital dialing words corresponding to alpha-numeric telephone number characters and a telephone switch signal, respectively, or for generating a plurality of binary addresses for outputting a plurality of digital tune words corresponding to a selected channel number from a memory matrix containing a plurality of said digital dialing and digital tune words to said tuner in tuning from a currently tuned channel to a desired channel when said modulated signal is not received;

character generator/control means coupled to said microcomputer means for receiving said telephone switch signal and said digital dialing words and coupled to said video display for providing said digital dialing words thereto for the presentation of the dialed alpha-numeric telephone number characters on said video display; and switching circuit means coupled to said character generator/control means for receiving said telephone switch signal and said digital dialing words and to said audio amplifier-speaker means, said microphone means and said telephone for providing said digital dialing words to said telephone following the receipt of said telephone switch signal for initiating a telephone call and coupled to said television receiver audio signal processing circuitry for answering a telephone call and for carrying on audio communication on said telephone by means of said television receiver.

7. In a television receiver for receiving a transmitted composite video signal having a video component and an audio component and having a microcomputer-controlled tuner for selectively tuning said television receiver from a currently tuned channel to a desired channel by means of a remotely located keyboard means having a plurality of selectable keys for generating binary signals corresponding to television channel numbers, said television receiver including means for receiving and providing said binary signals to said microcomputer-controlled tuner, a video display, and audio signal processing circuitry including audio amplifier-speaker means, a system for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

mode selection means coupled to said remote keyboard means for generating and transmitting to said binary signal receiving means in said television receiver a predetermined pulse pattern over a predetermined time period, said predetermined pulse pattern representing the telephone mode of operation of said television receiver;

counting means coupled to said binary signal receiving means for counting the number of binary signals received from said remote keyboard means following receipt of the first pulse in said telephone mode pulse pattern and the number of binary signals representing alpha-numeric telephone number characters subsequently received;

program memory means including a plurality of previously stored sequences of binary instructions for controlling said counting means;

central processing means coupled to said program memory means for recalling from said program memory means a predetermined sequence of stored binary signals representing said predetermined time interval and coupled to said counting means for activating said counting means for a predetermined time interval and for receiving from said counting means the number of binary signals representing the telephone mode of operation of said television receiver and alpha-numeric telephone number characters subsequently received during repetitive predetermined time intervals;

clock pulse generating means coupled to said counting means and said central processing means for providing clock pulses thereto for establishing said predetermined time intervals;

data memory means connected to said central processing means for temporarily storing said coded binary signals received during said repetitive predetermined time intervals and for storing a plurality of binary signal codes representing said telephone mode of operation and subsequently dialed alpha-numeric telephone number characters, said data memory means providing said received coded binary signals and said stored coded binary signals to said central processing means for comparison therein;

latch means coupled to said central processing means for receiving input signals in response to said comparisons and for providing first output signals in response thereto;

character generator/control means coupled to said latch means for receiving said first output signals and for producing second and third output signals, said second output signals being provided to said video display for presentation of the dialed alpha-numeric telephone number characters thereon; and switching circuit means connected to said character generator/control means and activated by said third output signals and connected to said audio signal processing circuitry, said audio amplifier-speaker means and said microphone means for selectively coupling said character generator/control means thereto and coupling said television receiver audio signal processing circuitry, said audio amplifier-speaker means and said microphone means to said telephone for answering or initiating a telephone call, respectively, and for audio communication on said telephone by means of said television receiver.

8. A telephone-television receiver system as in claim 7 wherein said binary signals generated and transmitted by said remote keyboard means are in the infrared frequency spectrum.

9. A telephone-television receiver system as in claim 8 wherein said binary signals are pulse code modulated.

10. A telephone-television receiver system as in claim 7 wherein the last dialed telephone number is read from said data memory means by said central processing means and provided to said telephone by the activation of said telephone mode selection means followed by engagement of selectable control means within a predetermined time interval thereafter.

11. A telephone-television receiver system as in claim 10 wherein said predetermined time interval is five seconds.

12. A telephone-television receiver system as in claim 7 further comprising audio switch control means coupled to said remote keyboard means for providing a switch control signal to said central processing means in recalling a privacy signal from said data memory means and providing said privacy signal to said switching circuit means for selectively electrically decoupling said microphone means from said television receiver in the telephone mode of operation.

13. A telephone-television receiver system as in claim 7 wherein said clock pulse generating means provides a timed signal to said audio amplifier-speaker means by means of said switching circuit means for selectively muting said audio amplifier-speaker means during telephone number dialing thus preventing the transmission by said audio amplifier-speaker means of break-and-make mechanical dialing sounds.

14. A telephone-television receiver system as in claim 7 wherein said clock pulse generating means provides a delay signal of a predetermined duration to said central processing means such that said central processing means reads data from said data memory means at a predetermined rate resulting in a predetermined time interval between individual digits being provided to said switching circuit means making said telephone-television receiver system compatible with a break-and-make mechanical dialing system.

15. A telephone-television receiver system as in claim 14 wherein said predetermined time interval between individual digits is approximately 600 milliseconds.

16. A telephone-television receiver system as in claim 7 wherein said central processing unit includes:

decoder means coupled to said program memory means for receiving and converting said sequences of binary quantities stored therein to program instructions;

accumulator means coupled to said counting means and to said decoder means for receiving program instructions and binary signals representing received pulse patterns, respectively, therefrom and for storing said program instructions and said received pulse patterns; and ALU means coupled to said decoder means, said data memory means and to said accumulator means for recalling the pulse patterns from said accumulator means and for comparing said pulse patterns with coded binary signals recalled from said data memory means in accordance with program instructions provided by said decoder means.

17. A telephone-television receiver system as in claim 16 further comprising program counter means connected to said program memory means for sequentially accessing predetermined binary instructions in controlling said counting means, said accumulator means and said ALU means.

18. In a television receiver for receiving a transmitted composite video signal having a video component and an audio component and having a microcomputer-controlled tuner for selectively tuning said television receiver from a currently tuned channel to a desired channel by means of an on-set keyboard means having a plurality of selectable keys for generating binary signals corresponding to television channel numbers, said television receiver including means for providing said binary signals to said microcomputer-controlled tuner, a video display, and audio signal processing circuitry including audio amplifier-speaker means, a system for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

mode selection means coupled to said on-set keyboard means for generating a predetermined pulse pattern over a predetermined time period, said predetermined pulse pattern representing the telephone mode of operation of said television receiver;

counting means coupled to said mode selection means for counting the number of binary signals received from said on-set keyboard means following receipt of the first pulse in said telephone mode pulse pattern and the number of binary signals representing alpha-numeric telephone number characters subsequently received;

program memory means including a plurality of previously stored sequences of binary instructions for controlling said counting means;

central processing means coupled to said program memory means for recalling from said program memory means a predetermined sequence of stored binary signals representing said predetermined time interval and coupled to said counting means for activating said counting means for a predetermined time interval and for receiving from said counting means the number of binary signals representing the telephone mode of operation of said television receiver and alpha-numeric telephone number characters subsequently received during repetitive predetermined time intervals;

clock pulse generating means coupled to said counting means and said central processing means for providing clock pulses thereto for establishing said predetermined time intervals;

data memory means connected to said central processing means for temporarily storing said coded binary signals received during said repetitive predetermined time intervals and for storing a plurality of binary signal codes representing said telephone mode of operation and subsequently dialed alpha-numeric telephone number characters, said data memory means providing said received coded binary signals and said stored coded binary signals to said central processing means for comparison therein;

latch means coupled to said central processing means for receiving input signals in response to said comparisons and for providing first output signals in response thereto;

character generator/control means coupled to said latch means for receiving said first output signals and for producing second and third output signals, said second output signals being provided to said video display for presentation of the dialed alpha-numeric telephone number characters thereon; and switching circuit means connected to said character generator/control means and activated by said third output signals and connected to said audio signal processing circuitry, said audio amplifier-speaker means and said microphone means for selectively coupling said character generator/control means thereto and for coupling said television receiver audio signal processing circuitry, said audio amplifier-speaker means and said microphone means to said telephone for answering or initiating a telephone call, respectively, and for audio communication on said telephone by means of said television receiver.

19. In a television receiver for receiving a transmitted composite video signal having a video component and an audio component and having a microcomputer-controlled tuner for selectively tuning said television receiver from a currently tuned channel to a desired channel by means of a remotely located keyboard means having a plurality of selectable keys for generating and transmitting pulse code modulated binary signals in the infrared frequency spectrum corresponding to television channel numbers, said television receiver including means for receiving and providing said binary signals to said microcomputer-controlled tuner, a video display, and audio signal processing circuitry including audio amplifier-speaker means, a system for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

mode selection means coupled to said remote keyboard means for generating and transmitting to said binary signal receiving means in said television receiver a predetermined pulse pattern over a predetermined time period, said predetermined pulse pattern representing the telephone mode of operation of said television receiver;

counting means coupled to said binary signal receiving means for counting the number of binary signals received from said remote keyboard means following receipt of the first pulse in said telephone mode pulse pattern and the number of binary signals representing alpha-numeric telephone number characters subsequently received;

program memory means including a plurality of previously stored sequences of binary instructions for controlling said counting means;

central processing means coupled to said program memory means for recalling from said program memory means a predetermined sequence of stored binary signals representing said predetermined time interval and coupled to said counting means for activating said counting means for a predetermined time interval and for receiving from said counting means the number of binary signals representing the telephone mode of operation of said television receiver and alpha-numeric telephone number characters subsequently received during repetitive predetermined time intervals;

clock pulse generating means coupled to said counting means and said central processing means for providing clock pulses thereto for establishing said predetermined time intervals and coupled to said audio amplifier-speaker means for providing a timed signal thereto by means of said switching circuit means for selectively muting said audio amplifier-speaker means during telephone number dialing thus preventing the transmission by said audio amplifier-speaker means of make-and-break mechanical dialing sounds;

data memory means connected to said central processing means for temporarily storing said coded binary signals received during said repetitive predetermined time intervals and for storing a plurality of binary signal codes representing said telephone mode of operation and subsequently dialed alpha-numeric telephone number characters, said data memory means providing said received coded binary signals and said stored coded binary signals to said central processing means for comparison therein;

latch means coupled to said central processing means for receiving input signals in response to said comparisons and for providing first output signals in response thereto;

character generator/control means coupled to said latch means for receiving said first output signals and for producing second and third output signals, said second output signals being provided to said video display for presentation of the dialed alpha-numeric telephone number characters thereon;

switching circuit means connected to said character generator/control means and activated by said third output signals and connected to said audio signal processing circuitry, said audio amplifier-speaker means and said microphone means for selectively coupling said character generator/control means thereto and for coupling said television receiver audio signal processing circuitry, said audio amplifier-speaker means and said microphone means to said telephone for answering or initiating a telephone call, respectively, and for audio communication on said telephone by means of said television receiver;

audio switch control means coupled to said remote keyboard means for providing a switch control signal to said central processing means in recalling a privacy signal from said data memory means and providing said privacy signal to said switching circuit means for selectively electrically decoupling said microphone means from said television receiver in the telephone mode of operation; and selectable control means coupled to said central processing means for reading out of said data memory means the previously dialed telephone number and providing said telephone number to said telephone following the activation of said mode selection means to the telephone mode and the engagement of said selectable control means within a predetermined time interval thereafter.

20. In a television receiver for receiving a transmitted composite video signal having a video component and an audio component and having a tuner for selectively tuning said television receiver from a currently tuned channel to a desired channel, said television receiver including a video display, character display means for displaying selected channel number, and audio signal processing circuitry including audio amplifier-speaker means, a system for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

remotely located control means having a plurality of selectable keys for generating binary signals representing channel numbers and alpha-numeric telephone number characters;

mode selection means coupled to said remote control means for generating a modulated signal, said modulated signal representing the telephone mode of operation of said television receiver;

microcomputer means coupled to said remotely located control means and said mode selection means for receiving said binary signals and said modulated signal and for generating a plurality of binary addresses for outputting said binary signals representing said alpha-numeric telephone number characters to said character display means for display thereon and a telephone switch signal, respectively, or for generating a plurality of binary addresses for outputting a plurality of digital tune words corresponding to a selected channel number from a memory matrix containing a plurality of said digital dialing and digital tune words to said tuner in tuning from a currently tuned channel to a desired channel when said modulated signal is not received; and switching circuit means coupled to said microcomputer means for receiving said telephone switch signal and said digital dialing words and to said audio amplifier-speaker means, said microphone means and said telephone for providing said digital dialing words to said telephone following the receipt of said telephone switch signal for initiating a telephone call and coupled to said television receiver audio signal processing circuitry for answering a telephone call and for carrying on audio communication on said telephone by means of said television receiver.

21. A telephone-television receiver as in claim 20 wherein said character display means is comprised of light emitting diodes.

22. In a television receiver for receiving a transmitted composite video signal having a video component and an audio component and having a tuner for selectively tuning said television receiver from a currently tuned channel to a desired channel, said television receiver including a video display and audio signal processing circuitry including audio amplifier-speaker means, a method for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

generating binary signals representing channel numbers and alpha-numeric telephone number characters;

generating a modulated signal representing the telephone mode of operation of said television receiver;

providing said binary signals and said modulated signal to microcomputer means having a memory matrix for generating a plurality of binary addresses for outputting a plurality of digital dialing words corresponding to alpha-numeric telephone number characters and a telephone switch signal, respectively, or for generating a plurality of binary addresses for outputting a plurality of digital tune words corresponding to a selected channel number from a memory matrix containing a plurality of said digital dialing and digital tune words to said tuner in tuning from a currently tuned channel to a desired channel when said modulated signal is not received; and providing said telephone switch signal and said digital dialing words to switching circuit means coupled to said audio amplifier-speaker means, said microphone means and said telephone for providing said digital dialing words to said telephone following the receipt of said telephone switch signal for initiating a telephone call and coupled to said television receiver audio signal processing circuitry for answering a telephone call and for carrying on audio communication on said telephone by means of said television receiver.

23. In a television receiver for receiving a transmitted composite video signal having a video component and an audio component and having a tuner for selectively tuning said television receiver from a currently tuned channel to a desired channel, said television receiver including a video display and audio signal processing circuitry including audio amplifier-speaker means, a method for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

generating binary signals representing channel numbers and alpha-numeric telephone number characters;

generating a modulated signal representing the telephone mode of operation of said television receiver;

providing said binary signals and said modulated signal to microcomputer means having a memory matrix for generating a plurality of binary addresses for outputting a plurality of digital dialing words corresponding to alpha-numeric telephone number characters and a telephone switch signal, respectively, or for generating a plurality of binary addresses for outputting a plurality of digital tune words corresponding to a selected channel number from a memory matrix containing a plurality of said digital dialing and digital tune words to said tuner in tuning from a currently tuned channel to a desired channel when said modulated signal is not received;

providing said telephone switch signal and said digital dialing words to character generator/control means coupled to said video display for providing said digital dialing words thereto for the presentation of the dialed alpha-numeric telephone number characters on said video display; and providing said telephone switch signal and said digital dialing words to switching circuit means coupled to said audio amplifier-speaker means, said microphone means and said telephone for providing said digital dialing words to said telephone following the receipt of said telephone switch signal for initiating a telephone call and coupled to said television receiver audio signal processing circuitry for answering a telephone call and for carrying on audio communication on said telephone by means of said television receiver.

24. A method as in claim 23 further comprising providing an audio control signal to said microcomputer means for recalling a privacy signal from said memory matrix and providing said privacy signal to said switching circuit means for selectively electrically decoupling said microphone means from said television receiver in the telephone mode of operation.

25. A method as in claim 24 wherein said microcomputer means provides a timed signal to said audio amplifier-speaker means by means of said switching circuit means for selectively muting said audio amplifier-speaker means during telephone number dialing thus preventing the transmission by said audio amplifier-speaker means of break-and-make mechanical dialing sounds.

26. A method as in claim 22 wherein said binary signals representing channel numbers and alpha-numeric telephone number characters are generated by means of a remotely located keyboard control means.

27. A method as in claim 22 wherein said binary signals representing channel numbers and alpha-numeric telephone number characters are generated by means of an on-set keyboard control means.

28. In a television receiver for receiving a transmitted composite video signal having a video component and an audio component and having a tuner for selectively tuning said television receiver from a currently tuned channel to a desired channel, said television receiver including a video display, character display means for displaying selected channel number, and audio signal processing circuitry including audio amplifier-speaker means, a method for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

generating binary signals representing channel numbers and alpha-numeric telephone number characters;

generating a modulated signal, said modulated signal representing the telephone mode of operation of said television receiver;

providing said binary signals and said modulated signal to microcomputer means having a memory matrix for generating a plurality of binary addresses for outputting said binary signals representing said alpha-numeric telephone number characters to said character display means for display thereon and a telephone switch signal, respectively, or for generating a plurality of binary addresses for outputting a plurality of digital tune words corresponding to a selected channel number from a memory matrix containing a plurality of said digital dialing and digital tune words to said tuner in tuning from a currently tuned channel to a desired channel when said modulated signal is not received; and providing said telephone switch signal and said digital dialing words and to switching circuit means coupled to said audio amplifier-speaker means, said microphone means and said telephone for providing said digital dialing words to said telephone following the receipt of said telephone switch signal for initiating a telephone call and coupled to said television receiver audio signal processing circuitry for answering a telephone call and for carrying on audio communication on said telephone by means of said television receiver.

29. A method as in claim 28 wherein said character display means is comprised of light emitting diodes.

30. In a television receiver for receiving a transmitted composite video signal having a video component and an audio component and having a microcomputer-controlled tuner for selectively tuning said television receiver from a currently tuned channel to a desired channel by means of remotely located keyboard means having a plurality of selectable keys for generating binary signals corresponding to television channel numbers, said television receiver including means for receiving and providing said binary signals to said microcomputer-controlled tuner, a video display and audio signal processing circuitry including audio amplifier-speaker means, a method for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

generating and transmitting to said binary signal receiving means in said television receiver a predetermined pulse pattern over a predetermined time period, said predetermined pulse pattern representing the telephone mode of operation of said television receiver;

counting the number of binary signals received from said remote keyboard means following receipt of the first pulse in said telephone mode pulse pattern and the number of binary signals representing alpha-numeric telephone number characters subsequently received;

controlling said counting means by means of program memory means including a plurality of previously stored sequences of binary instructions;

recalling from said program memory means a predetermined sequence of stored binary signals representing said predetermined time interval and coupled to said counting means for activating said counting means for a predetermined time interval and for receiving from said counting means the number of binary signals representing the telephone mode of operation of said television receiver and alpha-numeric telephone number characters subsequently received during repetitive predetermined time intervals;

providing clock pulses to said counting means and said central processing means for establishing said predetermined time intervals;

storing said coded binary signals received during said repetitive predetermined time intervals and said plurality of binary signal codes representing said telephone mode of operation and subsequently dialed alpha-numeric telephone number characters in data memory means, said data memory means providing said received coded binary signals and said stored coded binary signals to said central processing means for comparison therein;

providing input signals from said central processing means to latch means in response to said comparisons and generating first output signals from said latch means in response thereto;

providing said first output signals to character generator/control means for producing second and third output signals, said second output signals being provided to said video display for presentation of the dialed alpha-numeric telephone number characters thereon; and providing said third output signals to switching circuit means coupled to said audio signal processing circuitry, said audio amplifier-speaker means and for selectively coupling said character generator/control means thereto and coupling said television receiver audio signal processing circuitry, said audio amplifier-speaker means and said microphone means to said telephone for answering or initiating a telephone call, respectively, and for audio communication on said telephone by means of said television receiver.

31. In a television receiver for receiving a transmitted composite video signal having a video component and an audio component and having a microcomputer-controlled tuner for selectively tuning said television receiver from a currently tuned channel to a desired channel by means of an on-set keyboard means having a plurality of selectable keys for generating binary signals corresponding to television channel numbers, said television receiver including means for providing said binary signals to said microcomputer-controlled tuner, a video display, and audio signal processing circuitry including audio amplifier-speaker means, a method for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

generating a predetermined pulse pattern over a predetermined time period, by means of said on-set keyboard means, said predetermined pulse pattern representing the telephone mode of operation of said television receiver;

counting the number of binary signals received from said on-set keyboard means following receipt of the first pulse in said telephone mode pulse pattern and the number of binary signals representing alpha-numeric telephone number characters subsequently received;

controlling said counting means by means of program memory means including a plurality of previously stored sequences of binary instructions;

recalling from said program memory means a predetermined sequence of stored binary signals representing said predetermined time interval and coupled to said counting means for activating said counting means for a predetermined time interval and for receiving from said counting means the number of binary signals representing the telephone mode of operation of said television receiver and alpha-numeric telephone number characters subsequently received during repetitive predetermined time intervals;

providing clock pulses to said counting means and said central processing means for establishing said predetermined time intervals;

storing said coded binary signals received during said repetitive predetermined time intervals and said plurality of binary signal codes representing said telephone mode of operation and subsequently dialed alpha-numeric telephone number characters in data memory means, said data memory means providing said received coded binary signals and said stored coded binary signals to said central processing means for comparison therein;

providing input signals from said central processing means to latch means in response to said comparisons and generating first output signals from said latch means in response thereto;

providing said first output signals to character generator/control means for producing second and third output signals, said second output signals being provided to said video display for presentation of the dialed alpha-numeric telephone number characters thereon; and providing said third output signals to switching circuit means coupled to said audio signal processing circuitry, said audio amplifier-speaker means and said microphone means for selectively coupling said character generator/control means thereto and coupling said television receiver audio signal processing circuitry, said audio amplifier-speaker means and said microphone means to said telephone for answering or initiating a telephone call, respectively, and for audio communication on said telephone by means of said television receiver.

32. In a television receiver for receiving a transmitted composite video signal having a video component and an audio component and having a microcomputer-controlled tuner for selectively tuning said television receiver from a currently tuned channel to a desired channel by means of a remotely located keyboard means having a plurality of selectable keys for generating and transmitting pulse code modulated binary signals in the infrared frequency spectrum corresponding to television channel numbers, said television receiver including means for receiving and providing said binary signals to said microcomputer-controlled tuner, a video display, and audio signal processing circuitry including audio amplifier-speaker means, a method for selectively operating said television receiver in a television mode wherein said received video signals are presented on said video display and said received audio signals are provided to said audio signal processing circuitry and said audio amplifier-speaker means, and in a telephone mode wherein audio communication by means of a telephone coupled to said television receiver may be initiated or responded to with the audio signals transmitted by said telephone coupled to said audio signal processing circuitry and audio amplifier-speaker means and to microphone means for sensing acoustic signals during a telephone conversation comprising:

generating and transmitting to said binary signal receiving means in said television receiver by means of said remotely located keyboard means a predetermined pulse pattern over a predetermined time period, said predetermined pulse pattern representing the telephone mode of operation of said television receiver;

counting the number of binary signals received from said remote keyboard means following receipt of the first pulse in said telephone mode pulse pattern and the number of binary signals representing alpha-numeric telephone number characters subsequently received;

controlling said counting means by means of program memory means including a plurality of previously stored sequences of binary instructions for controlling said counting means;

recalling from said program memory means a predetermined sequence of stored binary signals representing said predetermined time interval and coupled to said counting means for activating said counting means for a predetermined time interval and for receiving from said counting means the number of binary signals representing the telephone mode of operation of said television receiver and alpha-numeric telephone number characters subsequently received during repetitive predetermined time intervals;

providing clock pulses to said counting means and said central processing means for establishing said predetermined time intervals;

storing said coded binary signals received during said repetitive predetermined time intervals and for storing said plurality of binary signal codes representing said telephone mode of operation and subsequently dialed alpha-numeric telephone number characters, in data memory means, said data memory means providing said received coded binary signals and said stored coded binary signals to said central processing means for comparison therein;

providing input signals from said central processing means to latch means in response to said comparisons and generating first output signals from said latch means in response thereto;

providing said first output signals to character generator/control means for producing second and third output signals, said second output signals being provided to said video display for presentation of the dialed alpha-numeric telephone number characters thereon; and providing said third output signals to switching circuit means coupled to said audio signal processing circuitry, said audio amplifier-speaker means and said microphone means for selectively coupling said character generator/control means thereto and for coupling said television receiver audio signal processing circuitry, said audio amplifier-speaker means and said microphone means to said telephone for answering or initiating a telephone call, respectively, and for audio communication on said telephone by means of said television receiver;

providing a switch control signal to said central processing means in recalling a privacy signal from said data memory means and providing said privacy signal to said switching circuit means for selectively electrically decoupling said microphone means from said television receiver in the telephone mode of operation; and reading out of said data memory means the previously dialed telephone number and providing said telephone number to said telephone following the activation of said mode selection means to the telephone mode and the engagement of said selectable control means within a predetermined time interval thereafter.

* * * * *